US012648059B2

(12) United States Patent
Aoki

(10) Patent No.: US 12,648,059 B2
(45) Date of Patent: Jun. 2, 2026

(54) SEMICONDUCTOR DEVICE AND MODULE

(71) Applicant: ROHM CO., LTD., Kyoto (JP)

(72) Inventor: Akira Aoki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 85 days.

(21) Appl. No.: 18/895,104

(22) Filed: Sep. 24, 2024

(65) Prior Publication Data

US 2025/0016896 A1 Jan. 9, 2025

Related U.S. Application Data

(63) Continuation of application No. PCT/JP2023/005650, filed on Feb. 17, 2023.

(30) Foreign Application Priority Data

Mar. 31, 2022 (JP) ................................ 2022-060375

(51) Int. Cl.
*H05B 45/14* (2020.01)

(52) U.S. Cl.
CPC .................................... *H05B 45/14* (2020.01)

(58) Field of Classification Search
CPC ...... H05B 45/14; H05B 45/375; H05B 45/40; H02M 1/0009; H02M 1/32; H02M 3/158
See application file for complete search history.

(56) References Cited

U.S. PATENT DOCUMENTS 9,585,207 B2 * 2/2017 Ramabhadran ........ H05B 45/39
10,569,695 B2 2/2020 Ichikawa et al.
(Continued)

FOREIGN PATENT DOCUMENTS

JP 2022-056872 4/2022
WO WO 2013/077269 5/2013
(Continued)

OTHER PUBLICATIONS

International Search Report and Written Opinion in International Appln. No. PCT/JP2023/005650, mailed on Mar. 28, 2023, 15 pages (with machine translation).
(Continued)

*Primary Examiner* — Adam D Houston
(74) *Attorney, Agent, or Firm* — Fish & Richardson P.C.

(57) ABSTRACT

A semiconductor device includes: a current sense circuit that generates a current sense signal corresponding to a monitoring target current; an error amplifier; a comparator; and a controller. The current sense circuit includes: a differential amplifier of a current output type; a first input resistor connected between a first input terminal of the differential amplifier and a first current sense terminal; a second input resistor connected between a second input terminal of the differential amplifier and a second current sense terminal; an output resistor configured to be connected to the output terminal of the differential amplifier; a first feedback current path across which a first feedback current is passed between the first input terminal and the output terminal of the differential amplifier; and a second feedback current path across which a second feedback current is passed between the second input terminal of the differential amplifier and the output terminal.

14 Claims, 21 Drawing Sheets

(56) References Cited

U.S. PATENT DOCUMENTS

| | | | | |
|---|---|---|---|---|
| 11,990,175 | B2 * | 5/2024 | Sato | G11C 11/4087 |
| 12,395,063 | B1 * | 8/2025 | Bing | H02M 1/0009 |
| 12,520,400 | B2 * | 1/2026 | De Mol | H05B 45/44 |
| 2013/0154484 | A1 * | 6/2013 | Xu | H05B 45/46<br>315/122 |
| 2016/0095178 | A1 * | 3/2016 | Kuang | H05B 45/10<br>315/224 |
| 2018/0178710 | A1 | 6/2018 | Ichikawa et al. | |
| 2021/0048453 | A1 | 2/2021 | Chao | |
| 2021/0076465 | A1 * | 3/2021 | Aoki | H05B 45/14 |
| 2022/0102969 | A1 * | 3/2022 | Aoki | H02H 3/087 |
| 2025/0016896 | A1 * | 1/2025 | Aoki | H02M 1/32 |
| 2025/0024568 | A1 * | 1/2025 | Aoki | H05B 45/54 |
| 2025/0337327 | A1 * | 10/2025 | Wu | H02M 1/32 |

FOREIGN PATENT DOCUMENTS

| | | | | |
|---|---|---|---|---|
| WO | WO 2017/022633 | | 2/2017 | |
| WO | WO-2023188965 | A1 * | 10/2023 | H02M 1/0009 |

OTHER PUBLICATIONS

DE OA—German Patent and Trademark Office, Office Action in German Appln. No. 112023000986, dated Nov. 25, 2024, 10 pages (with English translation).

* cited by examiner

SEMICONDUCTOR DEVICE AND MODULE

CROSS-REFERENCE TO RELATED APPLICATIONS

This nonprovisional application is a continuation application of International Patent Application No. PCT/JP2023/005650 filed on Feb. 17, 2023, which claims priority to Japanese Patent Application No. 2022-060375 filed on Mar. 31, 2022, the entire contents of which are hereby incorporated by reference.

TECHNICAL FIELD

The disclosure herein relates to semiconductor devices and modules.

BACKGROUND ART

Nowadays, semiconductor devices that incorporate a current sense circuit are used in a variety of applications.

One example of what has just been mentioned is seen in Patent Document 1 identified below.

CITATION LIST

Patent Literature

Patent Document 1: WO 2017/022633

DESCRIPTION OF EMBODIMENTS

LED Lamp Module (First Embodiment)

Figure 1:
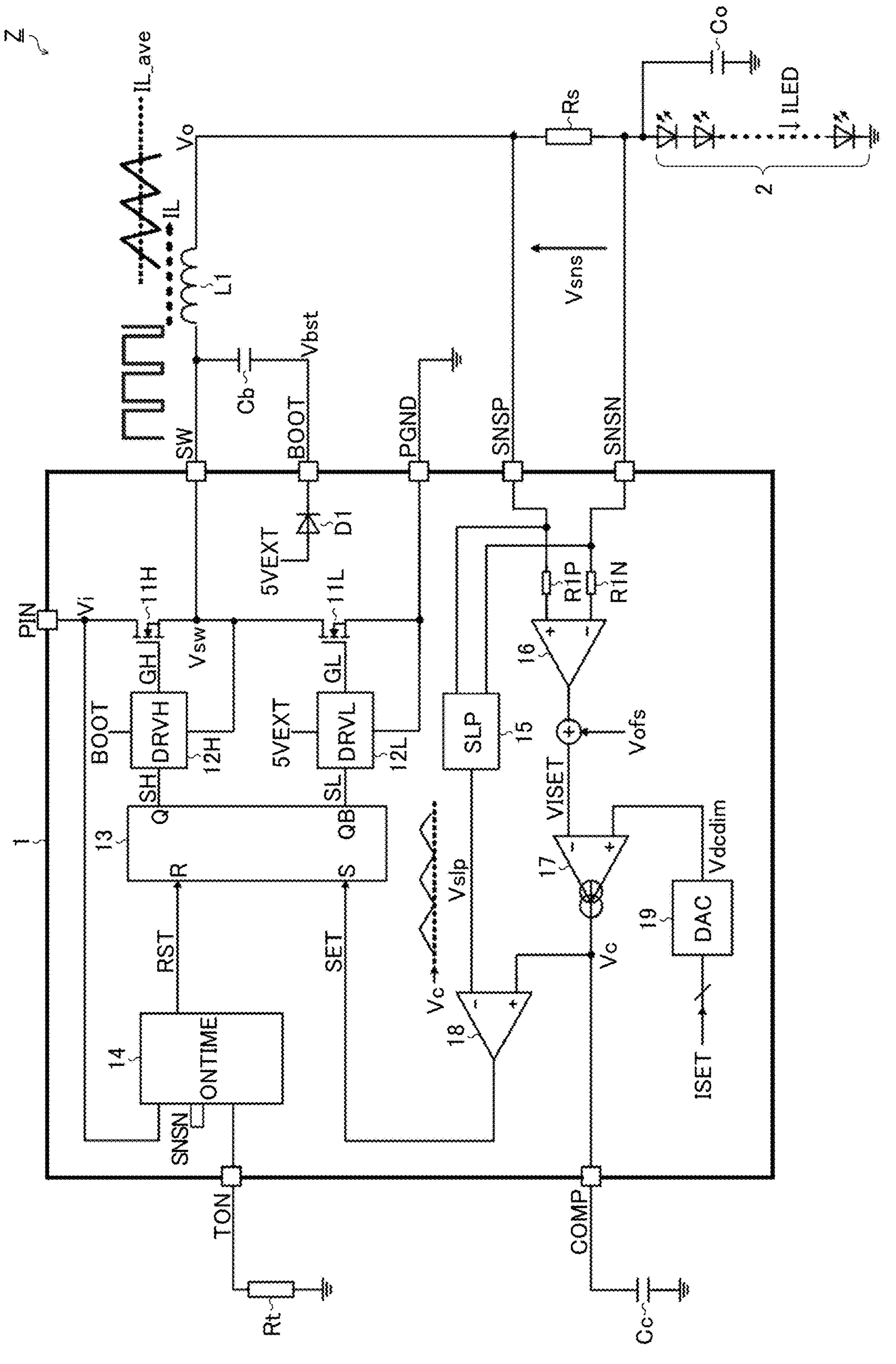
FIG. 1 is a diagram showing an LED lamp module according to a first embodiment.

FIG. 1 is a diagram showing an LED lamp module according to a first embodiment (basic configuration). The LED lamp module Z of the first embodiment includes an LED driver IC 1, an LED string 2 (a plurality of light-emitting diode elements connected in series), and various discrete components (capacitors Cb, Cc, and Co, an inductor L1, a resistor Rt, and a sense resistor Rs).

The LED driver IC 1 is a semiconductor device that bucks a power-system input voltage Vi to supply the LED string 2 with electric power. The LED driver IC 1 also has, for electrical connection with outside the IC, a plurality of external terminals (a PIN pin, a SW pin, a BOOT pin, a PGND pin, an SNSP pin, an SNSN pin, a TON pin, a COMP pin, and the like).

The PIN pin is a power-system supply terminal. The SW pin is a switching output terminal. The BOOT pin is a terminal for connection to a bootstrap capacitor for high-side gate driving. The PGND pin is a power-system ground terminal. The SNSP pin is a first current sense terminal (+). The SNSN pin is a second current sense terminal (−). The TON pin is a terminal for connection to a resistor for on-time setting. The COMP pin is a terminal for connection to a capacitor for phase compensation.

The PIN pin is connected to a power-system supply terminal (an application terminal for an input voltage Vi). The SW pin is connected to the first terminal of the inductor L1. The second terminal of the inductor L1 is connected to the first terminal of the sense resistor Rs. The second terminal of the sense resistor Rs is connected to the anode of the LED string 2. The cathode of the LED string 2 is connected to a ground terminal. Between the BOOT and SW pins, the capacitor Cb (bootstrap capacitor) is connected. Between the anode of the LED string 2 and the ground terminal, the capacitor Co (output capacitor) is connected. The first terminal (high-potential terminal) of the sense resistor Rs is connected to the SNSP pin. The second terminal (low-potential terminal) of the sense resistor Rs is connected to the SNSN pin. The PGND pin is connected to the power-system ground terminal. Between the TON pin and the ground terminal, the resistor Rt (on-time setting resistor) is connected. Between the COMP pin and the ground terminal, a capacitor Cc (phase-compensation capacitor) is connected.

<LED Driver IC>

With reference still to FIG. 1, the circuit configuration of the LED driver IC 1 will be described. The LED driver IC 1 of this configuration example includes, integrated in it as a means for driving the LED string 2, a high-side switch 11H, a low-side switch 11L, a high-side driver 12H, a low-side driver 12L, a controller 13, an on-time setter 14, a slope signal generator 15, a current sense amplifier 16, an error amplifier 17, a comparator 18, a DAC 19, a bootstrap diode D1. Needless to say, the LED driver IC 1 can further include, integrated in it, any components other than those mentioned above (such as a temperature sensing circuit, various protection circuits, and the like).

The high-side switch 11H is connected between the PIN and SW pins, and is turned on and off according to a high-side gate signal GH. The high-side switch 11H can be suitably implemented with an NMOSFET (N-channel metal-oxide-semiconductor field-effect transistor) or the like. In that case, the high-side switch 11H is on when GH=H (=BOOT), and is off when GH=L (=SW). The high-side switch 11H can be implemented with, instead of an NMOSFET, a PMOSFET (P-channel MOSFET). In that case, there is no need for the bootstrap diode D1, the capacitor Cb, and the BOOT pin.

The low-side switch 11L is connected between the SW and PGND pins, and is turned on and off according to a low-side gate signal GL. The low-side switch 11L can be suitably implemented with an NMOSFET or the like. In that case, the low-side switch 11L is on when GL=H (=5VEXT), and is off when GL=L (=PGND).

So connected, the high-side and low-side switches 11H and 11L constitute a half-bridge output stage that outputs from the SW pin a switching voltage Vsw with a rectangular waveform. That is, the high-side switch 11H corresponds to an output element and the low-side switch 11L corresponds to a synchronous rectification element. Note that the inductor L1, the sense resistor Rs, and the LED string 2 are connected in series with the high-side switch 11H. While the diagram shows a half-bridge output stage of a synchronous rectification type, if a diode rectification type is employed, the low-side switch 11L can be implemented with a diode.

The high-side driver 12H generates the high-side gate signal GH based on a high-side control signal SH fed from the controller 13. The high level of the high-side gate signal GH equals a boost voltage Vbst (≈Vsw+5VEXT) that appears at the BOOT pin. On the other hand, the low level of the high-side gate signal GH equals the switching voltage Vsw that appears at the SW pin.

The low-side driver 12L generates the low-side gate signal GL based on a low-side control signal SL fed from the controller 13. The high level of the low-side gate signal GL equals a constant voltage 5VEXT (an internal supply voltage or a voltage separately fed in from the outside). On the other hand, the low level of the low-side gate signal GL equals the terminal voltage (power-system ground voltage) at the PGND pin.

The controller 13 includes, for example, an RS flip-flop that receives a set signal SET and a reset signal RST, and generates the high-side and low-side control signals SH and SL so as to turn on and off the high-side and low-side switches 11H and 11L complementarily.

More specifically, the controller 13 generates the high-side and low-side control signals SH and SL mentioned above so as to, at a rise timing of the set signal SET, turn the high-side switch 11H on and the low-side switch 11L off and, at a rise timing of the reset signal RST, turn the high-side switch 11H off and the low-side switch 11L on.

In the present description, the term "complementarily" should be understood in a broad sense to cover not only operation where the on/off states of the high-side and low-side switches 11H and 11L are completely reversed but also operation where a simultaneously-off period (what is called a dead time) is secured to prevent a through current.

At the lapse of a predetermined on-time Ton from the rise timing of the set signal SET (hence the on-timing of the high-side switch 11H), the on-time setter 14 raises the reset signal RST to high level. The on-time setter 14 has a function of freely setting the on-time Ton according to the resistance value of the resistor Rt connected to the TON pin. The on-time setter 14 also has a function of varying, according to the terminal voltages at the PIN and SNSN pins respectively, the on-time Ton so as to reduce the variation of a switching frequency Fsw.

The slope signal generator 15 senses the terminal-to-terminal voltage between the SNSP and SNSN pins (i.e., a sense voltage Vsns that appears across the terminals of the sense resistor Rs) to generate a slope voltage Vslp that contains information (alternating-current component) on the inductor current IL. The slope voltage Vslp increases as the inductor current IL increases, and decreases as the inductor current IL decreases.

The current sense amplifier 16 (corresponding to a current sense circuit) amplifies the sense voltage Vsns mentioned above to generate a current sense signal VISET. The current sense signal VISET rises as the output current ILED (i.e., average inductor current IL_ave) passing through the sense resistor Rs increases, and falls as the output current ILED decreases. The current sense signal VISET can have any offset voltage Vofs (several hundred volts) added to it.

The error amplifier 17 outputs a current corresponding to the difference between an analog dimming signal Vdcdim (corresponding to a predetermined reference signal), which is fed to the non-inverting input terminal (+) of the error amplifier 17, and the current sense signal VISET, which is fed to the inverting input terminal (−) of the error amplifier 17. The error amplifier 17 thereby charges and discharges the capacitor Cc to generate an error signal Vc. The error signal Vc rises when VISET<Vdcdim, and falls when VISET<Vdcdim.

The comparator 18 generates the set signal SET by comparing the slope voltage Vslp, which is fed to the inverting input terminal (−) of the comparator 18, with the error signal Vc, which is fed to the non-inverting input terminal (+) of the comparator 18. The set signal SET is at low level when Vc<Vslp, and is at high level when Vc>Vslp. Accordingly, the lower the error signal Vc, the later the rise timing of the set signal SET (hence the on-timing of the high-side switch 11H) and, the higher the error signal Vc, the earlier the rise timing of the set signal SET.

The DAC 19 converts an m-bit (e.g., m=10) digital dimming signal ISET, which is fed to the LED driver IC 1 from the outside, into an analog dimming signal Vdcdim.

Of the components described above, the high-side and low-side drivers 12H and 12L, the controller 13, the on-time setter 14, the slope signal generator 15, the current sense amplifier 16, the error amplifier 17, the comparator 18, and the DAC 19 function as an output feedback controller employing a bottom-detection fixed-on-time scheme, driving the high-side and low-side switches 11H and 11L complementarily so as to keep the output current ILED supplied from the SW pin to the LED string 2 equal to a predetermined target value.

<Output Feedback Control>

Figure 2:
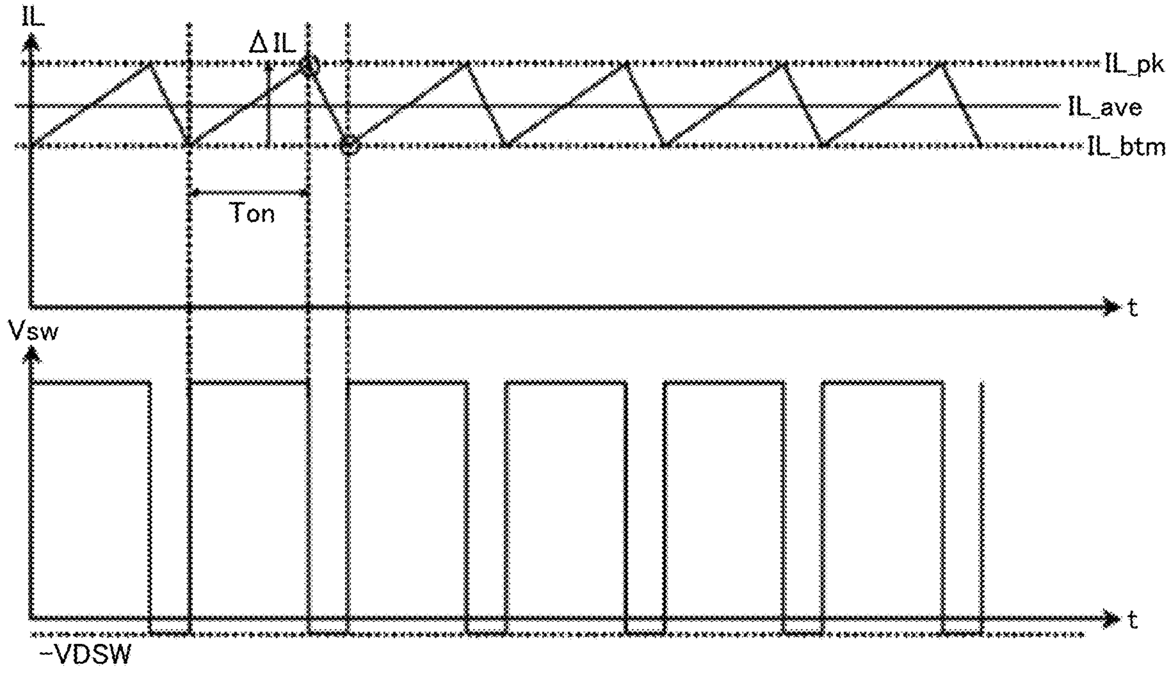
FIG. 2 is a diagram showing output feedback control by a bottom-detection fixed-on-time scheme.

FIG. 2 is a diagram showing output feedback control of a bottom-detection fixed-on-time scheme, depicting, from top down, the inductor current IL and the switching voltage Vsw.

When the high-side switch 11H is off and the low-side switch 11L is on, the switching voltage Vsw is at low level (which equals the negative voltage appearing between the drain and the source of the low-side switch 11L-VDSW). In this state, the inductor current IL that passes from the PGND pin via the low-side switch 11L to the SW pin decreases as the inductor L1 discharges energy.

When the inductor current IL decreases down to a bottom value IL_btn corresponding to the error signal Vc, then Vc>Vslp, so that the set signal SET rises to high level. As a result, the high-side switch 11H turns on and the low-side switch 11L turns off. Now, the switching voltage Vsw is at high level (≈Vi) and thus the inductor current IL that passes from the PIN pin via the high-side switch 11H to the SW pin increases.

After that, at the lapse of a predetermined on-time Ton, the reset signal RST rises to high level; thus, the high-side switch 11H turns off and the low-side switch 11L turns on, so that the inductor current IL stops increasing and starts decreasing. As a result, the inductor current IL has a rippled waveform such that it repeats increasing and decreasing between a peak value IL_pk and a bottom value IL_btm.

Here, the bottom value IL_btm of the inductor current IL varies with the current sense signal VISET (corresponding to the average inductor current IL_ave) and the analog dimming signal Vdcdim (corresponding to the target value of the average inductor current IL_ave). On the other hand, the ripple amplitude ΔIL (=IL_pk−IL_btm) of the inductor current IL is determined according to the on-time Ton.

Accordingly, as the above sequence of operation is repeated, in the LED driver IC 1, output feedback control of a bottom-detection fixed-on-time scheme is performed such that the average inductor current IL_ave (hence the output current ILED) is equal to the predetermined target value.

The scheme for output feedback control in the LED driver IC 1 is not limited to what has been described above; for example, instead of a bottom-detection fixed-on-time scheme, a peak-detection fixed-off-time scheme can be employed. Or a hysteresis-window scheme can be employed. In an application that does not require fast response, a linear control scheme such as a PWM (pulse-width modulation) control scheme can be employed.

LED Lamp Module (Second Embodiment)

Figure 3:
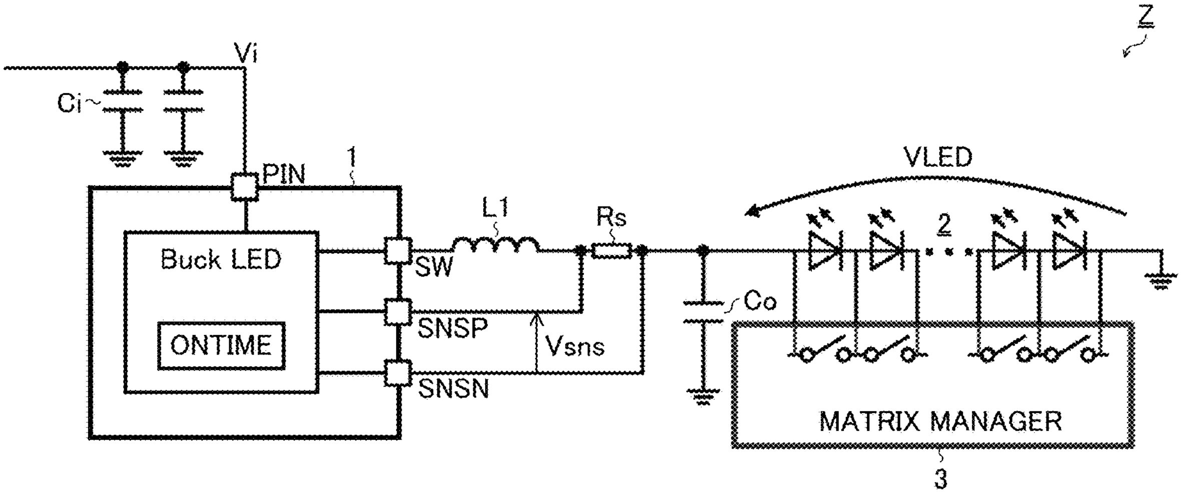
FIG. 3 is a diagram showing an LED lamp module according to a second embodiment.

FIG. 3 is a diagram showing an LED lamp module according to a second embodiment. The LED lamp module Z of the second embodiment is based on the first embodiment (FIG. 1) described previously and further includes a matrix manager 3. The diagram also expressly shows a capacitor Ci (an input capacitor) connected between the PIN pin of the LED driver IC 1 and the ground terminal.

The matrix manager 3 includes a plurality of switch elements that are each connected in parallel with one of the plurality of light-emitting diode elements constituting the LED string 2. The matrix manager 3 can turn on and off the switch elements individually and thereby freely change the number of effective stages of light-emitting diode elements (the number of them that are lit)

Figure 4:
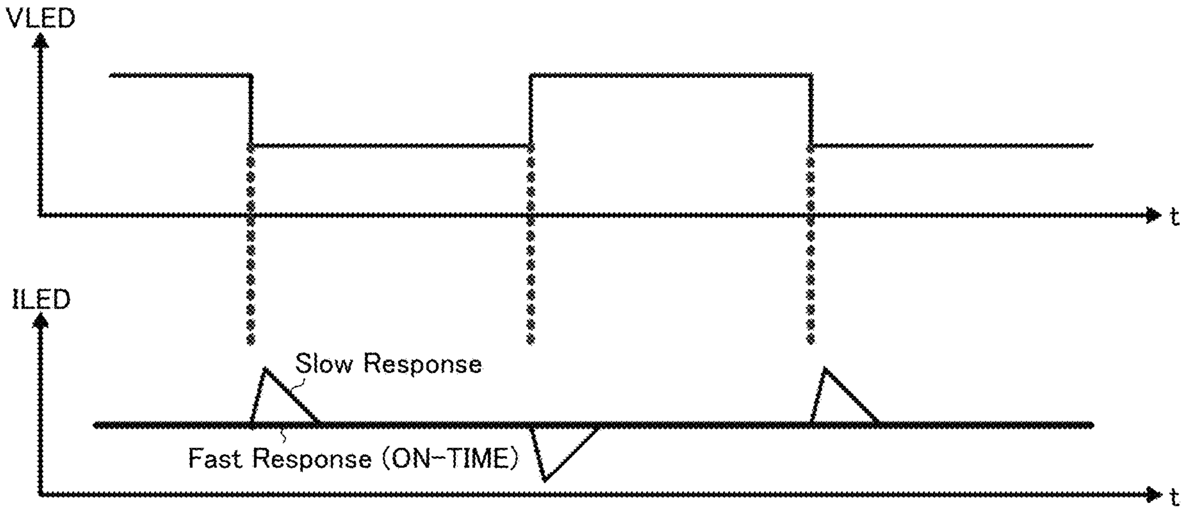
FIG. 4 is a diagram showing the response performance desired in an LED driver IC.

FIG. 4 is a diagram showing the response performance desired in the LED driver IC 1 in the LED lamp module Z of the second embodiment, depicting, from top down, the terminal-to-terminal voltage across the LED string 2 (i.e., the sum of the forward drop voltages across the light-emitting diode elements that are lit) and the output current ILED.

In the LED lamp module Z of the second embodiment, owing to the provision of the matrix manager 3, while the LED string 2 is lit, the number of light-emitting diode elements lit (hence the terminal-to-terminal voltage VLED across the LED string 2) can vary sharply.

Accordingly, to light each of the light-emitting diode elements with constant luminance, it is necessary to raise the response speed of the LED driver IC 1 so that it can keep supplying a constant output current ILED despite the variation of the number of light-emitting diode elements lit.

To achieve that, it is preferable to employ, as the scheme for output feedback control in the LED driver IC 1, a non-linear control scheme (e.g., a bottom-detection fixed-on-time scheme), which excels in fast response. Note that, employing a non-linear control scheme requires the sensing of the average inductor current IL_ave, and this is commonly achieved by inserting a sense resistor Rs in the stage subsequent to the inductor L1 and sensing the sense voltage Vsns appearing across it with the LED driver IC 1.

<Load-Open/Short Test>

Figure 5:
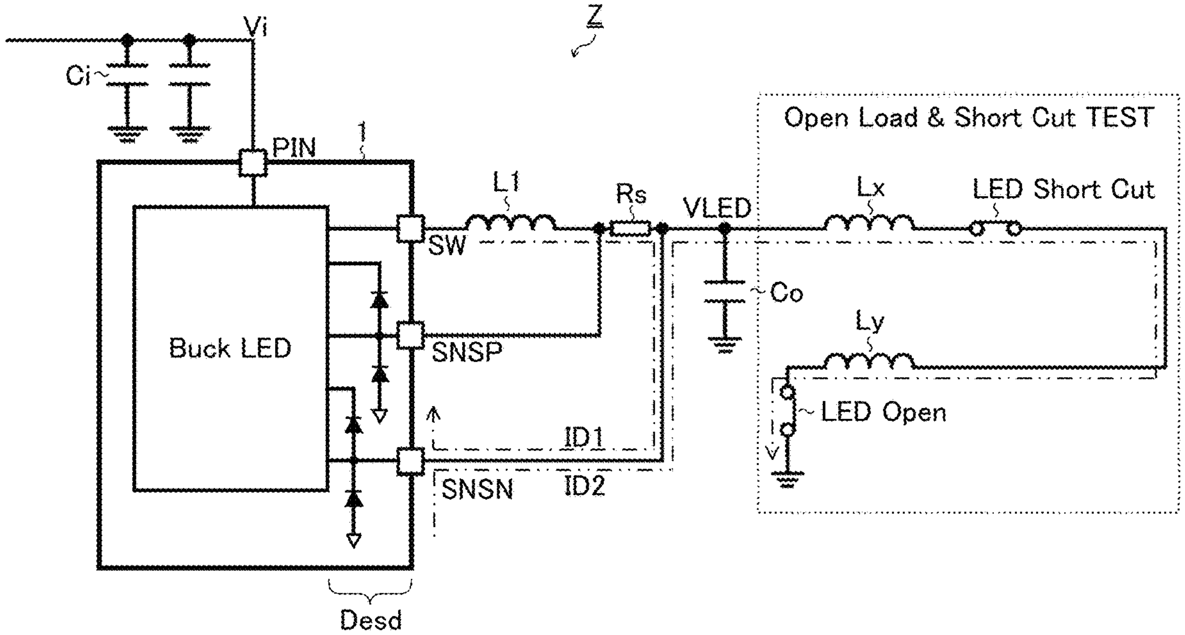
FIG. 5 is a diagram showing the paths of surge currents that pass in a load-open/short test.
Figure 6:
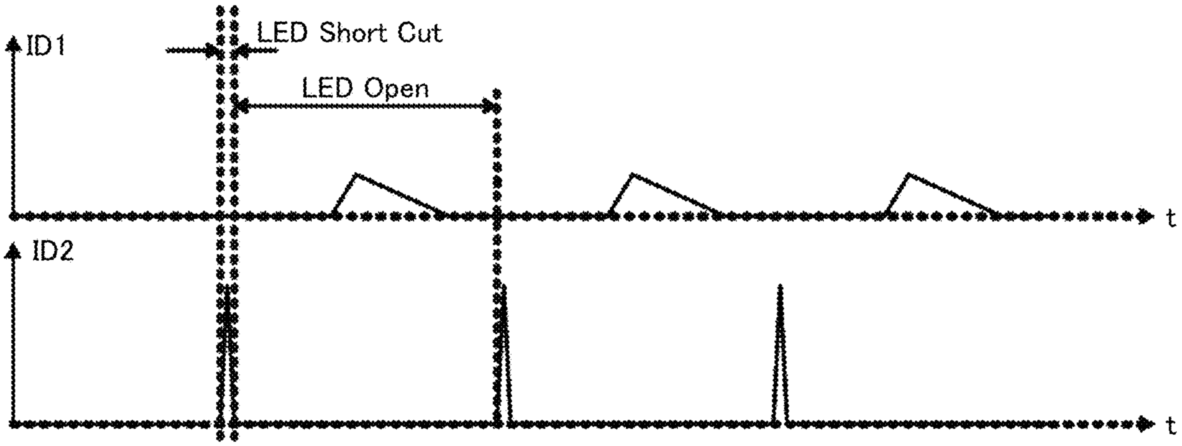
FIG. 6 is a diagram showing the waveforms of surge currents that pass in a load-open/short test.

FIGS. 5 and 6 are diagrams showing the paths and the waveforms, respectively, of surge currents ID1 and ID2 that pass in a load-open/short test.

First, a load-open test will be studied. While the LED string 2 is lit, if a light-emitting diode element becomes open, the current path leading to the LED string 2 is cut off. Thus, a counter-electromotive force in the inductor L1 charges the capacitor Co and causes an output overshoot. As a result, a surge current ID1 passes back to the supply terminal via electrostatic protection diodes Desd incorporated in the LED driver IC 1 (in particular, a high-side electrostatic protection diode connected between the SNSN pin and the supply terminal).

In a case where the LED driver IC 1 employs a non-linear control scheme (e.g., a bottom-detection fixed-on-time scheme), the inductor L1 is given a relatively high inductance value (several tens to several hundred microhenries) compared with the capacitance value (several microfarads) of the capacitor Co. Thus, the inductor L1 stores so high energy that a surge current ID1 of several amperes passes back for a relatively long time. As a result, the high-side electrostatic protection diode Desd, which has a current capacity as low as several milliamperes, may be destroyed.

Next, a load-short test will be studied. For example, in a case where the LED lamp module Z is for vehicle onboard use, the LED driver IC 1 and the LED string 2 are mounted on separate circuit boards. These circuit boards are connected together by a wire harness with a length of about 1 m to 1.5 m. Thus, the wire harness has non-negligible parasitic inductance components Lx and Ly (about 1 μH).

Thus, if a light-emitting diode element becomes shorted (this can happen in lit-number switching control by the matrix manager 3), the parasitic inductance components Lx and Ly are charged with energy from the capacitor Co and in addition a surge current ID2 of several tens of amperes passes instantaneously from the ground terminal via the electrostatic protection diodes Desd incorporated in the LED driver IC 1 (in particular, the low-side electrostatic protection diode connected between the SNSN pin and the ground terminal). As a result, the low-side electrostatic protection diode Desd, which has a current capacity as low as several tens of milliamperes, may be destroyed.

LED Lamp Module (Third Embodiment)

Figure 7:
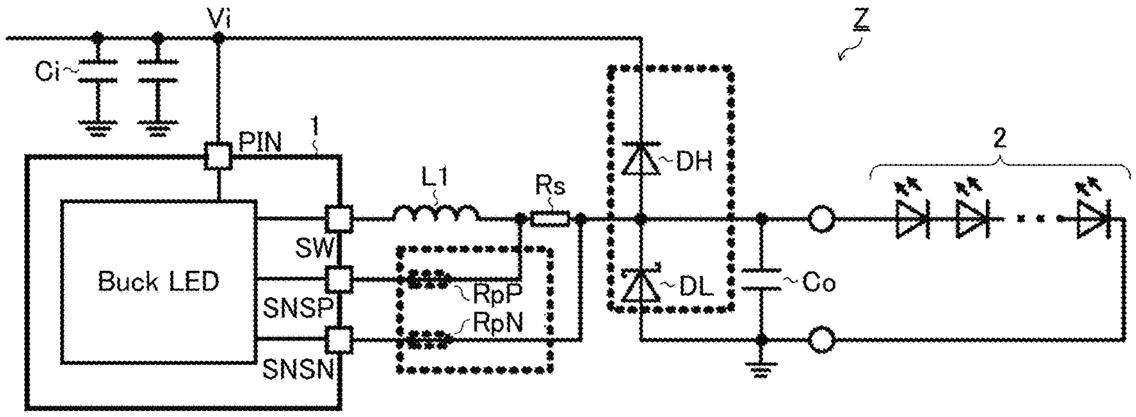
FIG. 7 is a diagram showing an LED lamp module according to a third embodiment.

FIG. 7 is a diagram showing an LED lamp module according to a third embodiment. The LED lamp module Z of the third embodiment has surge protection diodes DH and DL externally connected to it as a means for protecting the above-mentioned electrostatic protection diodes Desd (see FIG. 5) from a surge current.

The surge protection diode DH is connected between the anode of the LED string 2 and an application terminal for the input voltage Vi. The surge protection diode DL is connected between the anode of the LED string 2 and the ground terminal.

With this circuit configuration, even if a light-emitting diode element becomes open or shorted, it is possible to clamp the anode potential of the LED string 2 within a predetermined range and thereby to protect the electrostatic protection diodes Desd in the LED driver IC 1.

This however is achieved through addition, per channel, of two surge protection diodes DH and DL, which are relatively expensive, and this may inconveniently lead to an increase in the cost of the LED lamp module Z (including the costs for component procurement and transportation). It may also lead to an increase in the component mounting area on a circuit board.

Instead of the surge protection diodes DH and DL being externally connected, current-limiting resistors RpP and RpN (about 1 k Ω), which are less expensive and more compact, can be externally connected to the SNSP and SNSN pins, respectively, of the LED driver IC 1 to suppress a surge current passing through the electrostatic protection diodes Desd and in addition divert the surge current via the electrostatic protection diodes Desd to the supply terminal or the ground terminal.

The current-limiting resistor RpP can be connected between the SNSP pin and the first terminal (high-potential terminal) of the sense resistor Rs. The current-limiting resistor RpN can be connected between the SNSN pin and the second terminal (low-potential terminal) of the sense resistor Rs.

Inconveniently, simply externally connecting the current-limiting resistors RpP and RpN leads to a drop in the accuracy of the sensing of the output current ILED in the LED driver IC 1. This will now be studied in detail below.

Figure 8:
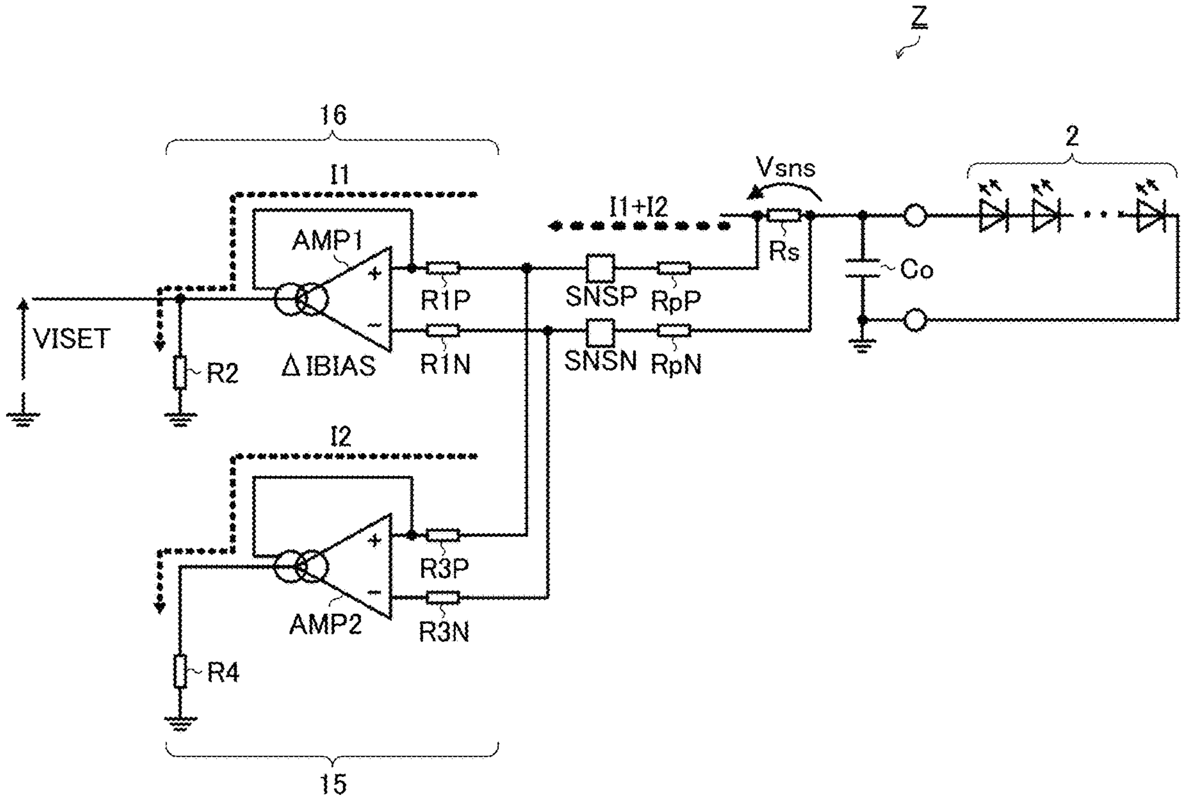
FIG. 8 is a diagram showing how a gain error occurs in a current sense amplifier.

FIG. 8 is a diagram showing how a gain error occurs in the current sense amplifier 16 as a result of the current-limiting resistors RpP and RpN being externally connected.

As shown in the diagram, the current sense amplifier 16 includes a differential amplifier AMP1 of a current output type, input resistors R1P and R1N, and an output resistor R2. The non-inverting input terminal (+) of the differential amplifier AMP1 is connected to the first terminal of the input resistor R1P (e.g., 10 k Ω). The second terminal of the input resistor R1P is connected to the SNSP pin. The inverting input terminal (−) of the differential amplifier AMP1 is connected to the first terminal of the input resistor R1N (e.g., 10 k Ω). The second terminal of the input resistor R1N is connected to the SNSN pin. The output terminal of the differential amplifier AMP1 is connected to the first terminal of the output resistor R2 (e.g., 120 k Ω) and also to the non-inverting input terminal (+) of the differential amplifier AMP1. The second terminal of the output resistor R2 is connected to the ground terminal.

The slope signal generator 15 includes a differential amplifier AMP2 of a current output type, input resistors R3P and R3N, and an output resistor R4. The non-inverting input terminal (+) of the differential amplifier AMP2 is connected to the first terminal of the input resistor R3P (e.g., 10 k Ω). The second terminal of the input resistor R3P is connected to the SNSP pin. The inverting input terminal (−) of the differential amplifier AMP2 is connected to the first terminal of the input resistor R3N (e.g., 10 k Ω). The second terminal of the input resistor R3N is connected to the SNSN pin. The output terminal of the differential amplifier AMP2 is connected to the first terminal of the output resistor R4 (e.g., 10 k Ω) and also to the non-inverting input terminal (+) of the differential amplifier AMP2. The second terminal of the output resistor R4 is connected to the ground terminal.

Between the non-inverting input terminal (+) and the output terminal of the differential amplifier AMP1 passes a feedback current I1. This feedback current I1 is essential for high-accuracy current feedback control. Likewise, between the non-inverting input terminal (+) and the output terminal of the differential amplifier AMP2 passes a feedback current I2.

As described above, a common current sense amplifier 16 for non-linear control on the average inductor current IL_ave includes a differential amplifier AMP1 provided with a floating input stage that can amplify the sense voltage Vsns on a rail-to-rail basis (between the supply potential and the ground potential). Here, "floating" means floating (potentially isolated) from the ground potential.

If, for the sake of discussion, the current-limiting resistors RpP and RpN are not externally connected to the SNSP and SNSN pins respectively, the gain G of the current sense amplifier 16 is uniquely determined according to the ratio of the input resistor R1 to the output resistor R2 (G=R2/R1, e.g., G=12).

By contrast, with the current-limiting resistors RpP and RpN externally connected, the terminal current (I1+I2) passing through the SNSP pin causes variation in the differential input current difference ΔIBIAS (i.e., the difference between the input currents passing at the non-inverting input terminal (+) and the non-inverting input terminal (+), respectively, of the differential amplifier AMP1).

As a result, the gain G of the current sense amplifier 16 is not uniquely determined according to the ratio of the input resistor R1 to the output resistor R2, and thus the current sense signal VISET (=Vsns·R2·R3/(R1·R3+R3·Rp+Rp·R1)) deviates greatly from its supposed value (=Vsns·R2/R1). Notably, as either of the feedback current I1 and I2 increases, the current sense signal VISET varies more greatly.

While the input resistor R1 and the output resistor R2 incorporated in the LED driver IC 1 are well-paired and operate in such a way as to cancel out their respective temperature characteristics, the externally connected current-limiting resistors RpP and RpN not only have completely different temperature coefficients from the input resistor R1 and the output resistor R2 but also have manufacturing variations. This eventually results in the current sense signal VISET exhibiting greatly varying temperature characteristics.

One possible remedy is to trim the input resistor R1 such that the combined resistance of the input resistor R1 and the current-limiting resistor RpP remains constant. This, however, leads to a greatly increased chip size of the LED driver IC 1 and thus is not a feasible solution.

LED Lamp Module (Fourth Embodiment)

Figure 9:
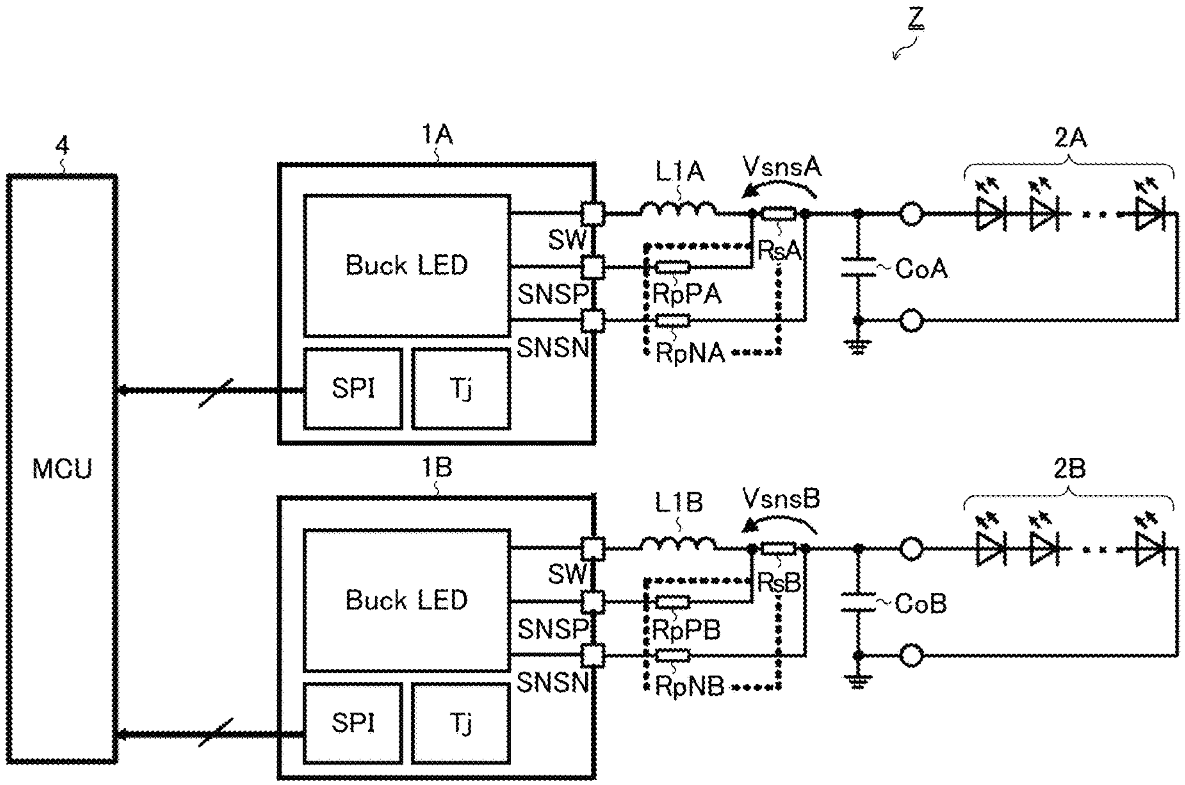
FIG. 9 is a diagram showing an LED lamp module according to a fourth embodiment.

FIG. 9 is a diagram showing an LED lamp module according to a fourth embodiment. The LED lamp module Z of the fourth embodiment includes two sets of the previously described components (the LED driver IC 1, the LED string 2, the inductor L1, the capacitor Co, the sense resistor Rs, and the current-limiting resistors RpP and RpN), one set for each of two channels (in the diagram, the components are distinguished by the suffixes "A" and "B" appended to their reference signs). The two channels are controlled comprehensively by an MCU 4.

The LED driver ICs 1A and 1B each include, in addition to a buck converter for supplying electric power to the LED string 2A or 2B, a temperature sensor for sensing the internal junction temperature Tj, a communicator for SPI (serial peripheral interface) communication with the MCU 4, and the like.

Here, externally connecting the current-limiting resistors RpPA and RpNA and the current-limiting resistors RpPB and RpNB poses a problem of a drop (in particular, temperature drift) in current sense accuracy in each of the LED driver ICs 1A and 1B.

One solution is, for example, to monitor the internal junction temperature Tj in each of the LED driver ICs 1A and 1B with the MCU 4 and keep dynamically correcting the sensing result of each of the sense voltages VsnsA and VsnsB based on the monitoring results.

Figure 10:
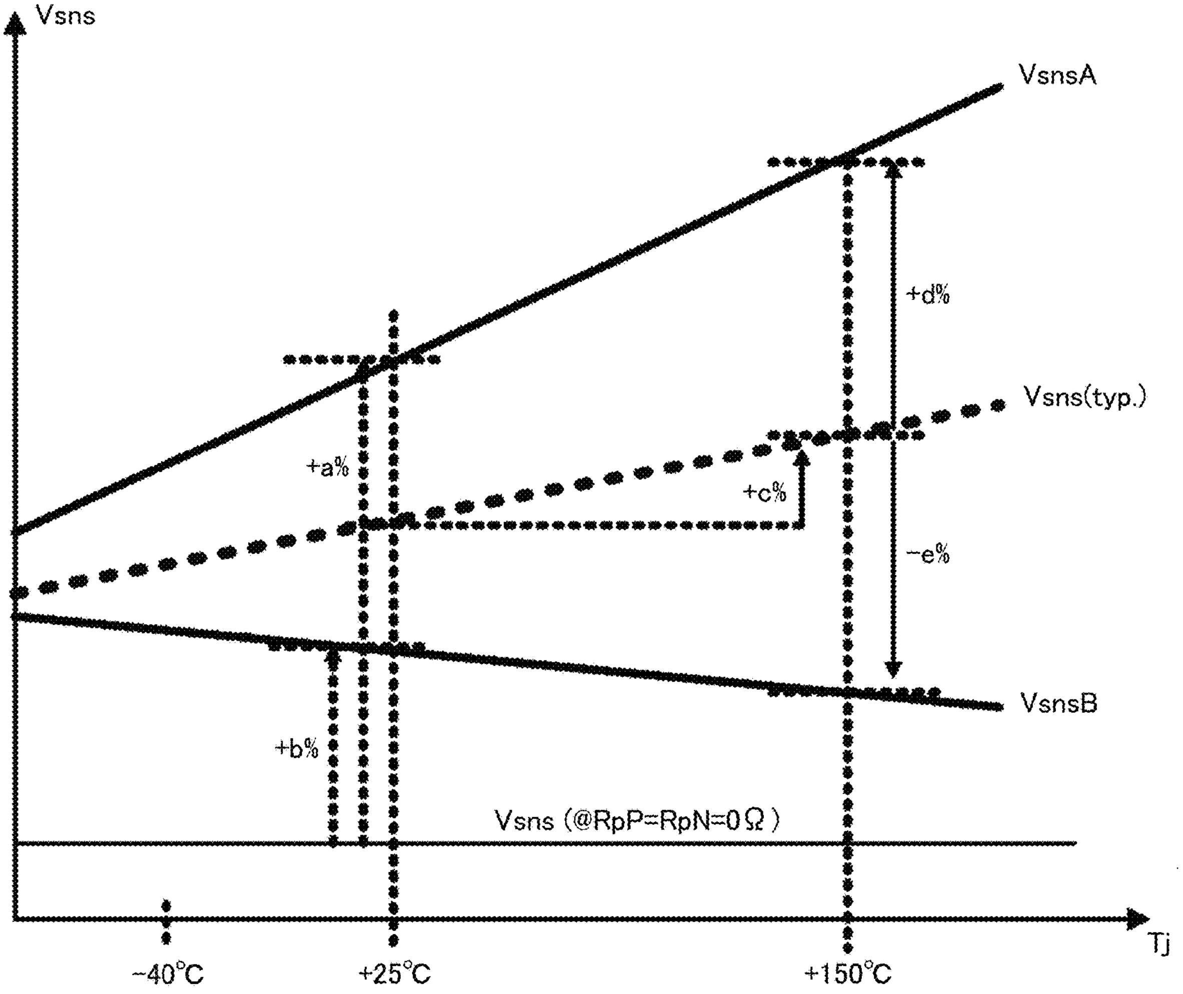
FIG. 10 is a diagram showing the temperature characteristics of a current sense signal.

FIG. 10 is a diagram showing the temperature characteristics of the result of sensing the sense voltage Vsns (corresponding to the current sense signal VISET described previously). The thick solid line VsnsA represents the sensing result of the sense voltage VsnsA in the LED driver IC 1A, and the thick solid line VsnsB represents the sensing result of the sense voltage VsnsB in the LED driver IC 1B. On the other hand, the fine solid line Vsns (@RpP=RpN=0Ω) represents the sensing result of the sense voltage Vsns with neither of the current-limiting resistors RpP and RpN externally connected, and the thick broken line Vsns (typ.) represents the temperature characteristics taken as the reference for correction by the MCU 4.

As shown in the diagram, the sensing results of the sense voltages VsnsA and VsnsB have different temperature characteristics. For example, at Tj=+25° C., the sensing results of the sense voltages VsnsA and VsnsB are shifted respectively by +a % and +b % (where a≠b) as compared with the sensing result without the externally connected resistors.

Thus, even if the sensing results of the sense voltages VsnsA and VsnsB are dynamically corrected with the MCU 4 by using as the reference for correction the temperature characteristics of +c % (where c≠a, b), it is difficult to sufficiently cancel out their respective temperature characteristics. In terms of what is shown in the diagram, over the entire temperature range (from −40° C. to +150° C.), a maximum of ±(d+e) % of temperature drift is left uncorrected between the LED driver ICs 1A and 1B.

Moreover, to keep dynamically correcting the sensing results of the sense voltages VsnsA and VsnsB with the MCU 4, it is necessary to keep executing a sequence of read/write commands, and this increases the load on the MCU 4.

LED Lamp Module (Fifth Embodiment)

Figure 11:
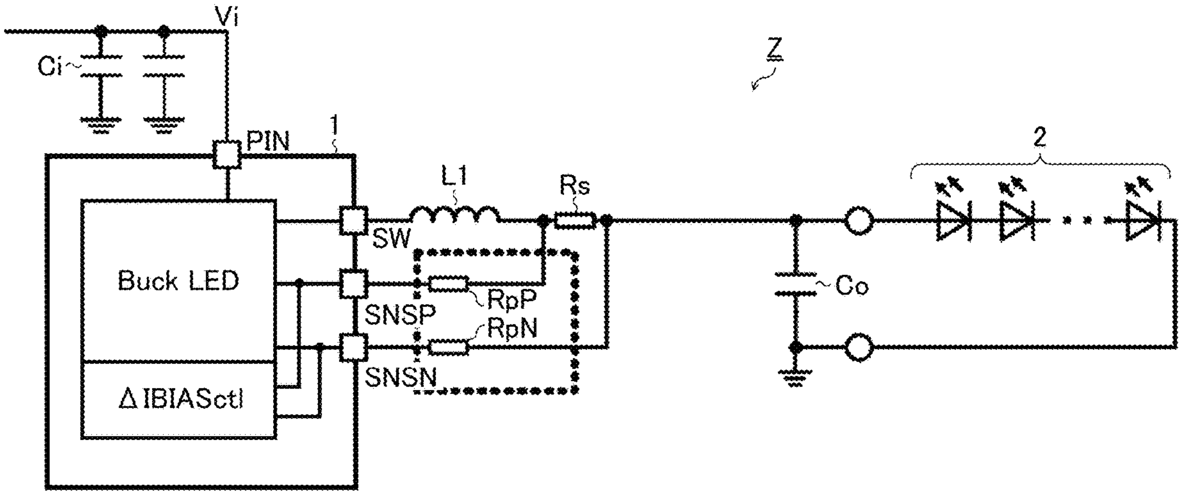
FIG. 11 is a diagram showing an LED lamp module according to a fifth embodiment.

FIG. 11 is a diagram showing an LED lamp module according to a fifth embodiment. In the LED lamp module Z of the fifth embodiment, the LED driver IC 1 includes a functional block (ΔIBIASctl) for reducing the differential input current difference ΔIBIAS in the differential amplifier AMP1 (see FIG. 8) in the current sense amplifier 16 and is devised so as to reduce the gain error in the current sense amplifier 16 even with the current-limiting resistors RpP and RpN externally connected.

Figure 12:
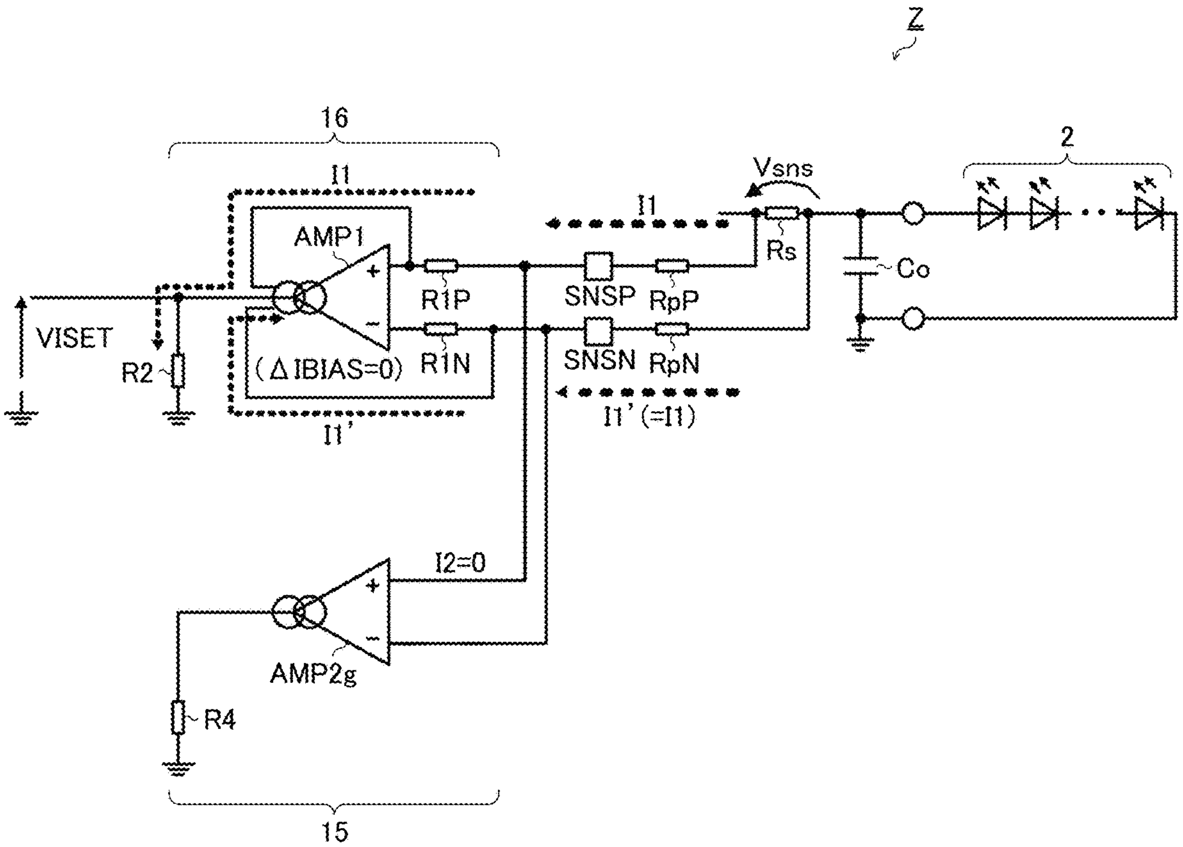
FIG. 12 is a diagram showing how a gain error in a current sense amplifier is eliminated.

FIG. 12 is a diagram showing how a gain error in the current sense amplifier 16 is eliminated. As shown in the diagram, in the LED driver IC 1 of the fifth embodiment, the current sense amplifier 16 not only has a first feedback current path configured to pass the feedback current I1 between the non-inverting input terminal (+) and the output terminal of the differential amplifier AMP1 but also additionally has a second feedback current path configured to pass a feedback current I1' between the SNSN pin and the output terminal of the differential amplifier AMP1.

Here, the feedback current I1' is a copy (mirror current) of the feedback current I1 and these currents can have the same current value (about 20 μA at the maximum). By in this way passing on the reference side of the differential amplifier AMP1 the feedback current I1' with the same value as the feedback current I1, it is possible to keep the differential input current difference ΔIBIAS close to zero.

However, the feedback currents I1 and I1' do not necessary have to have exactly the same value; they can have any offset between them.

The slope signal generator 15 includes, instead of the differential amplifier AMP2 described previously, a gm amplifier AMP2*g* that, without drawing a current from the SNSP and SNSN pins, senses the sense voltage Vsns that appears across those terminals. In this way, in a slope signal generator 15 that is not required to have very high current sense accuracy, a gm amplifier AMP2*g* that does not require feedback current control can be used to make the feedback current I2 mentioned above zero.

With this configuration, even if the current-limiting resistors RpP and RpN are externally connected to the SNSP and SNSN pins, the gain G of the current sense amplifier 16 is uniquely determined according to the ratio of the input resistor R1 to the output resistor R2. This helps eliminate a drop (in particular, temperature drift) in current sense accuracy in the LED driver IC 1.

Moreover, externally connecting the current-limiting resistors RpP and RpN makes it possible to protect the electrostatic protection diodes Desd (see FIG. 5) in the LED driver IC 1 from the surge currents ID1 and ID2. This eliminates the need for the surge protection diodes DH and DL that are otherwise needed one each for each channel. It is thus possible to reduce the cost of the LED lamp module Z and to reduce the component mounting area on the circuit board.

Note that, in the on-time setter 14 (see FIG. 1) described previously, the means for sensing the terminal voltage (=VLED) appearing at the SNSN pin is often implemented with a simple resistor voltage division circuit. However, from the viewpoint of improving current sense accuracy, in the on-time setter 14 it is preferable to use, instead of a resistor voltage division circuit as just mentioned, a source follower that, without drawing a current from the SNSP and SNSN pins, senses the terminal voltage appearing at the SNSN pin.

LED Lamp Module (Sixth Embodiment)

Figure 13:
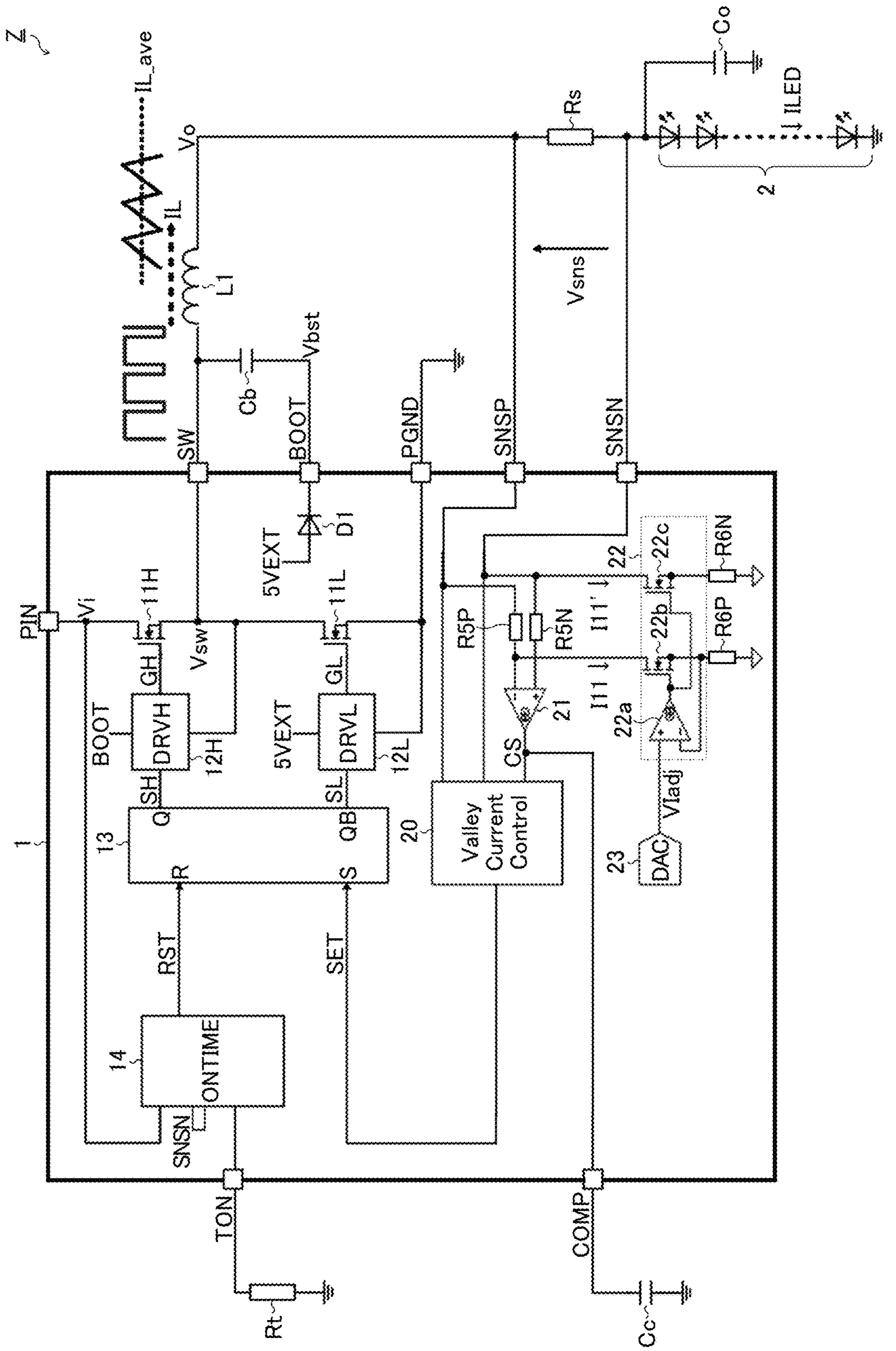
FIG. 13 is a diagram showing an LED lamp module according to a sixth embodiment.

FIG. 13 is a diagram showing an LED lamp module according to a sixth embodiment. The LED lamp module Z of the sixth embodiment includes, instead of the components 15 to 19 in FIG. 1, a valley current controller 20, a current sense amplifier 21, a V-I converter 22, and a DAC 23. Moreover, the LED driver IC 1 has integrated in it input resistors R5P and R5N (e.g., both 10 k Ω) and feedback resistors R6P and R6N (e.g., both 140 k Ω). These components 20 to 23 can all be understood as the components of a current sense circuit.

The valley current controller 20 generates the set signal SET mentioned previously through bottom detection (valley detection) on the inductor current IL based on the sense voltage Vsns, which appears across the terminals of the sense resistor Rs, and a current sense signal CS, which is generated by the current sense amplifier 21.

The current sense amplifier 21 is a differential amplifier of a current output type that is provided with a floating input stage that can amplify the input voltage on a rail-to-rail basis. The inverting-input terminal (–) of the current sense amplifier 21 is connected to the first terminal of the input resistor R5P. The second terminal of the input resistor R5P is connected to the SNSP pin. The non-inverting input terminal (+) of the current sense amplifier 21 is connected to the first terminal of the input resistor R5N. The second terminal of the input resistor R5N is connected to the SNSN pin. The output terminal of the current sense amplifier 21 is connected via the COMP pin to a phase-compensation capacitor Cc.

The V-I converter 22 is a functional block that converts a voltage signal (specifically, a current adjustment voltage Vladj) into a current signal (specifically, reference currents I11 and I11'), and includes an operational amplifier 22*a* and NMOSFETs 22*b* and 22*c*.

The operational amplifier 22*a* controls the gates of the NMOSFETs 22*b* and 22*c* such that the current adjustment voltage Vladj, which is fed to the non-inverting input terminal (+) of the operational amplifier 22*a*, is equal to the terminal voltage (=I11×R6P) across the feedback resistor R6P, which is fed to the inverting input terminal (–) of the operational amplifier 22*a*. Thus, the reference current I11 through the NMOSFET 22*b* and the reference current I11' through the NMOSFET 22*c* each have a current value (=Vladj/R6P) corresponding to the voltage value of the current adjustment voltage Vladj and the resistance value of the feedback resistor R6P. That is, the gain of the V-I converter 22 depends on the feedback resistor R6P.

The drain of the NMOSFET 22*b* is connected to the inverting input terminal (–) of the current sense amplifier 21 and to the first terminal of the input resistor R5P. The source of the NMOSFET 22*b* is connected to the first terminal of the feedback resistor R6P and to the inverting input terminal (–) of the operational amplifier 22*a*. The second terminal of the feedback resistor R6P is connected to the ground terminal. The gate of the NMOSFET 22*b* is connected to the output terminal of the operational amplifier 22*a*.

On the other hand, the drain of the NMOSFET 22*c* is connected to the second terminal of the input resistor R5N and to the SNSN pin. The source of the NMOSFET 22*c* is connected to the first terminal of the feedback resistor R6N. The second terminal of the feedback resistor R6N is connected to the ground terminal. The gate of the NMOSFET 22*c* is connected to the output terminal of the operational amplifier 22*a*.

The DAC 23 converts an unillustrated digital signal (e.g., of 10 bits) into the current adjustment voltage Vladj, which is an analog signal.

In the current sense circuit of this embodiment, the current sense amplifier 21 generates the current sense signal CS by amplifying the difference between a scaled current adjustment voltage (=VIadj×R5P/R6P) and the sense voltage Vsns, which is fed between the SNSP and SNSN pins. With the current sense signal CS, the bottom detection value (value detection value) of the inductor current IL is controlled. As a result, the output current ILED is adjusted to VIadj×R5P/(R6P×Rs).

Figure 14:
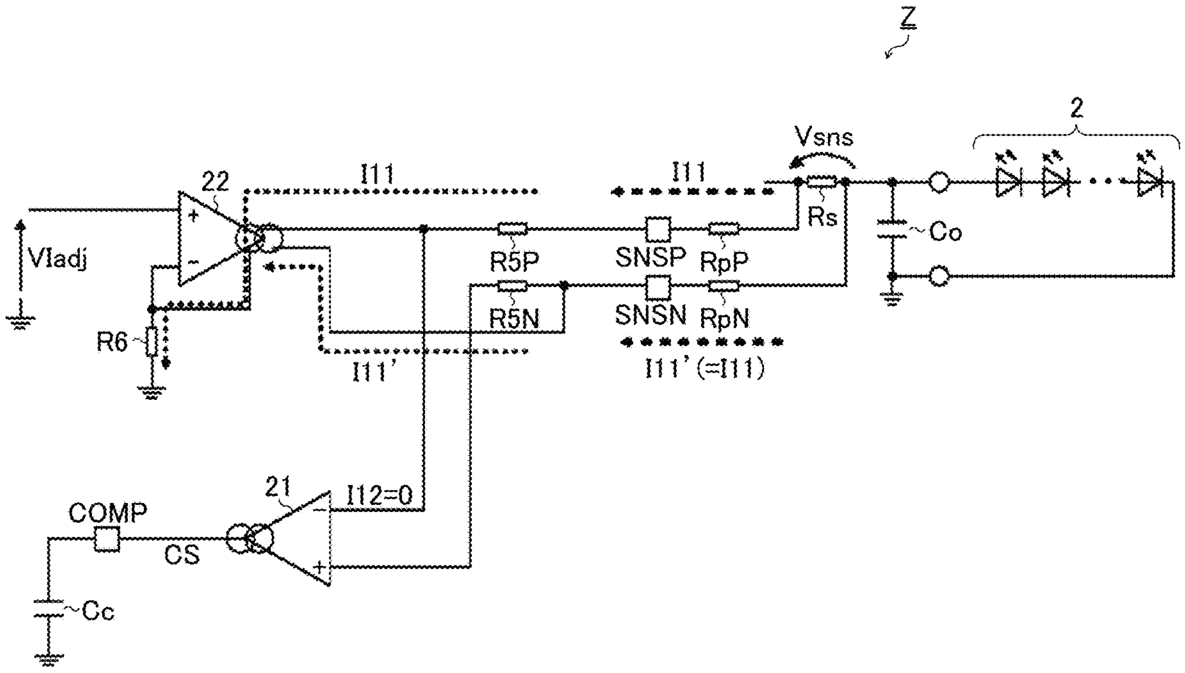
FIG. 14 is a diagram equivalently showing a current sense circuit in the sixth embodiment.

FIG. 14 is a diagram equivalently showing the current sense circuit of the second embodiment. The feedback resistor R6 in the diagram can be understood to be the feedback resistor R6P (or feedback resistor R6N) in FIG. 13.

As shown in in the diagram, in the current sense circuit of this embodiment, to generate the reference voltage for the current sense amplifier 21 (i.e., the scaled current adjustment voltage VIadj×R5P/R6P) requires that the reference current I11 be passing through the V-I converter 22. To achieve that, the current sense circuit of this embodiment includes a first reference current path configured to pass the reference current I11 between the SNSN pin and the first output terminal of the V-I converter 22 (i.e., the drain of the NMOSFET 22*b*).

However, a configuration where the reference current I11 passes only through the current-limiting resistor RpP externally connected to the SNSP pin, the reference voltage for the current sense amplifier 21 deviates by the terminal-to-terminal voltage across the current-limiting resistor RpP. To avoid that, the current sense circuit of this embodiment includes a second reference current path configured to pass the reference current I11' between the SNSN pin and the second output terminal of the V-I converter 22 (i.e., the drain of the NMOSFET 22*c*). The reference currents I11 and I11' can have the same value, or can have any offset between them.

With this configuration where the reference current I11 needed to generate the reference voltage for the current sense amplifier 21 is corrected with the reference current I11', even if the SNSP and SNSN pins have the current-limiting resistors RpP and RpN externally connected to them respectively, the gain of the V-I converter 22 (hence the reference voltage for the current sense amplifier 21) is uniquely determined according to the ratio of the input resistor R5P to the feedback resistor R6, and it is thus possible to eliminate a drop (in particular, temperature drift) in current sense accuracy in the LED driver IC 1.

In the current sense circuit of this embodiment, the current sense amplifier 21 functions as a gm amplifier that, without drawing the feedback current I2 from the SNSP and SNSN pins, generates the current sense signal CS by amplifying the difference between the scaled current adjustment voltage (=VIadj×R5P/R6P) and the sense voltage Vsns.

LED Lamp Module (Seventh Embodiment)

Figure 15:
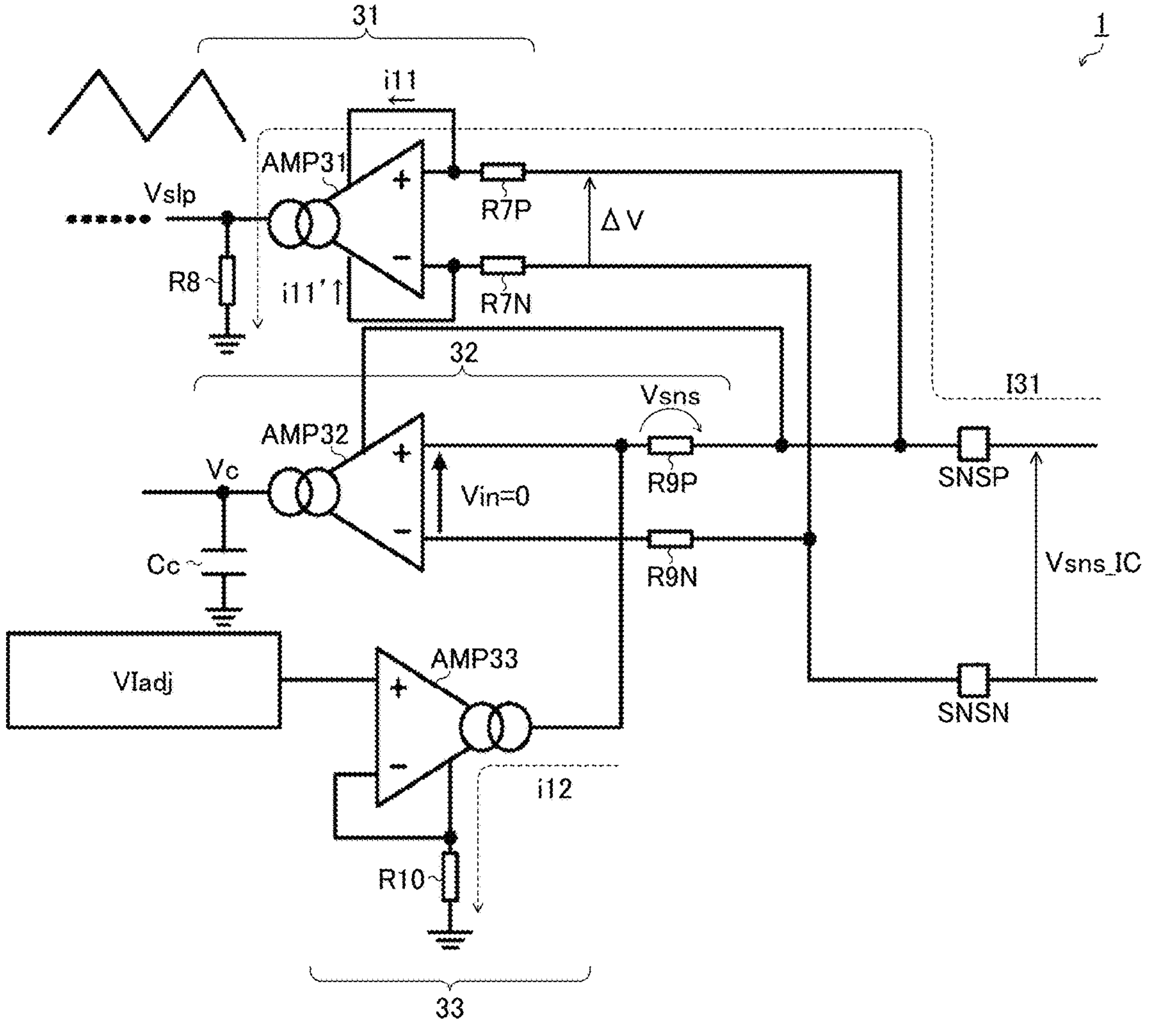
FIG. 15 is a diagram showing an LED lamp module according to a seventh embodiment.

FIG. 15 is a diagram showing an LED lamp module according to a seventh embodiment (corresponding to a first comparative example for comparison with the ninth embodiment described later). In the LED lamp module Z of the this embodiment, the LED driver IC 1 is based on the first embodiment (FIG. 1) described previously and includes, instead of the components 15 to 17 and 19, a current sense amplifier 31, an error amplifier 32, and a V-I converter 33.

The current sense amplifier 31 is a functional block that generates, according to a sense voltage Vsns_IC applied between the SNSP and SNSN pins, a slope signal Vslp containing current information on the inductor current IL and that feeds the slope signal Vslp to the comparator 18 (unillustrated). The current sense amplifier 31 includes a gm amplifier AMP31, input resistors R7P and R7N, and an output resistor R8.

The non-inverting input terminal (+) of the gm amplifier AMP31 is connected to the first terminal of the input resistor R7P. The second terminal of the input resistor R7P is connected to the SNSP pin. The inverting input terminal (–) of the gm amplifier AMP31 is connected to the first terminal of the input resistor R7N. The second terminal of the input resistor R7N is connected to the SNSN pin. The output terminal of the gm amplifier AMP31 is connected to the first terminal of the output resistor R8. The second terminal of the output resistor R8 is connected to the ground terminal.

The gm amplifier AMP31 also has a first feedback current path configured to pass a first feedback current i11 between the output terminal and the non-inverting input terminal (+) of the gm amplifier AMP31 and a second feedback current path configured to pass a second feedback current i11' between the output terminal and the inverting input terminal (−) of the gm amplifier AMP31. The second feedback current i11' can be a copy (mirror current) of the first feedback current i11, or can be one obtained by giving a copy of the first feedback current i11 an offset.

The error amplifier 32 is a functional block that generates the error signal Vc according to the sense voltage Vsns_IC applied between the SNSP and SNSN pins. The error amplifier 32 includes a gm amplifier AMP32, input resistors R9P and RON, and a capacitor Cc.

The non-inverting input terminal (+) of the gm amplifier AMP32 is connected to the first terminal of the input resistor R9P. The second terminal of the input resistor R9P is connected to the supply terminal of the gm amplifier AMP32 and to the SNSP pin. The inverting input terminal (−) of the gm amplifier AMP32 is connected to the first terminal of the input resistor R9N. The second terminal of the input resistor RON is connected to the SNSN pin. The output terminal of the gm amplifier AMP32 is connected to the first terminal of the capacitor Cc. The second terminal of the capacitor Cc is connected to the ground terminal.

The V-I converter 33 is a functional block that converts the current adjustment voltage Vladj into a reference current i12, and includes a gm amplifier AMP33 and a feedback resistor R10. The gm amplifier AMP33 controls the reference current i12 passing through the input resistor R9P such that the current adjustment voltage Vladj, which is fed to the non-inverting input terminal (+) of the gm amplifier AMP33, is equal to the terminal voltage (=i12×R10) across the feedback resistor R10, which is fed to the inverting input terminal (−) of the gm amplifier AMP33.

As described above, in the LED driver IC 1 of this embodiment, the current sense amplifier 31 for sensing a current ripple component ΔIL and the error amplifier 32 for sensing the average inductor current IL_ave are connected in parallel between the SNSP and SNSN pins.

When the sense voltage Vsns_IC appears between the SNSP and SNSN pins, an input potential difference ΔV occurs in the current sense amplifier 31 and a sense current I31 passes at the SNSP pin. As a result, a current difference occurs between the SNSP and SNSN pins, and this causes a drop in current sense accuracy in the LED driver IC 1 (hence a deviation of the output current ILED from the target value). To eliminate the current difference requires that the input potential difference ΔV in the current sense amplifier 31 be zero.

On the other hand, in the error amplifier 32, the difference (i.e., the input potential difference Vin) between the sense voltage Vsns_IC and the reference voltage becomes zero under output feedback control.

In the light of the above studies, the present inventor has found out that using the feedback control pint (Vin=0) of the error amplifier 32 as the input to the gm amplifier AMP31 makes the input potential difference ΔV in the gm amplifier AMP31 zero. Presented below will be novel embodiments based on this finding.

LED Lamp Module (Eighth Embodiment)

Figure 16:
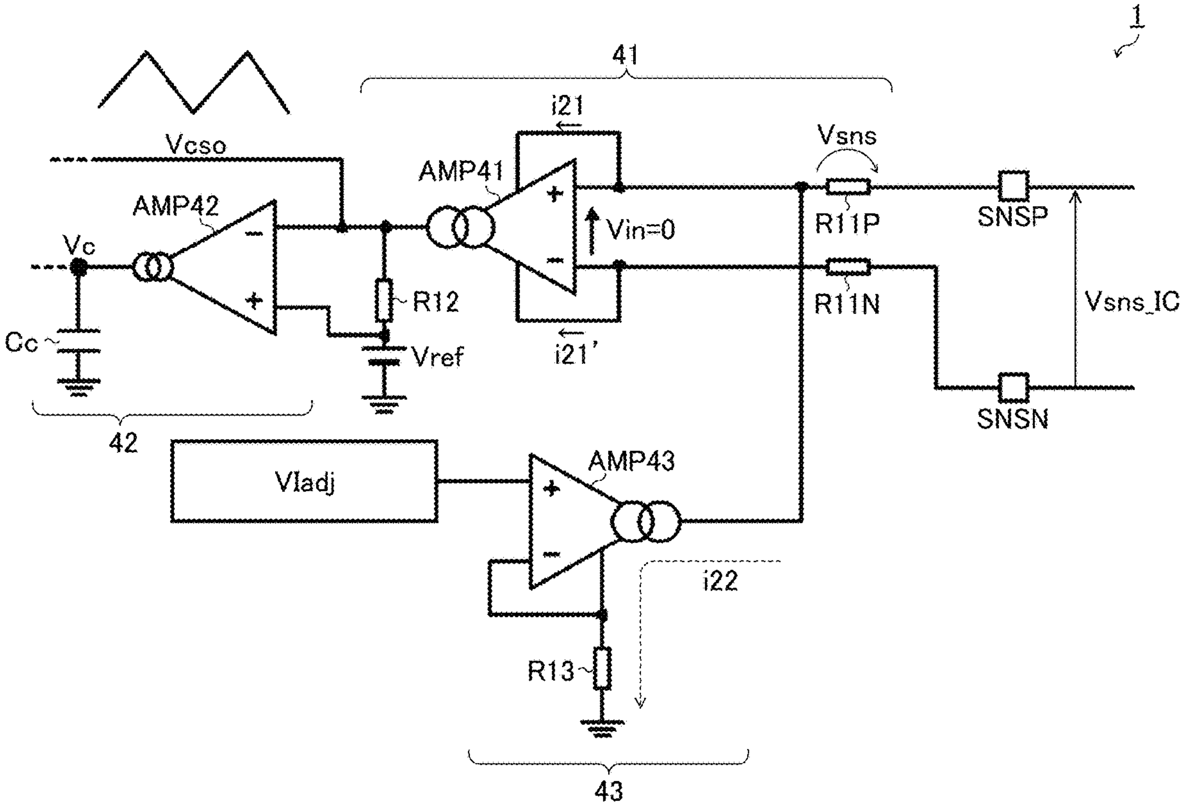
FIG. 16 is a diagram showing an LED lamp module according to an eighth embodiment.

FIG. 16 is a diagram showing an LED lamp module according to an eighth embodiment. In the LED lamp module Z of the this embodiment, the LED driver IC 1 is based on the first embodiment (FIG. 1) described previously and includes, instead of the components 15 to 17 and 19, a current sense amplifier 41, an error amplifier 42, and a V-I converter 43.

The current sense amplifier 41 is a functional block that generates, according to the sense voltage Vsns_IC applied between the SNSP and SNSN pins, a current sense signal Vcso containing current information on the inductor current IL and that feeds the current sense signal Vcso to the comparator 18 (unillustrated). The current sense amplifier 41 includes a gm amplifier AMP41, input resistors R11P and R11N, and an output resistor R12.

The non-inverting input terminal (+) of the gm amplifier AMP41 is connected to the first terminal of the input resistor R11P. The second terminal of the input resistor R11P is connected to the SNSP pin. The inverting input terminal (−) of the gm amplifier AMP41 is connected to the first terminal of the input resistor R11N. The second terminal of the input resistor R11N is connected to the SNSN pin. The output terminal of the gm amplifier AMP41 is connected to the first terminal of the output resistor R12. The second terminal of the output resistor R12 is connected to an application terminal for a reference signal Vref.

The gm amplifier AMP41 also has a first feedback current path configured to pass a first feedback current i21 between the output terminal and the non-inverting input terminal (+) of the gm amplifier AMP41 and a second feedback current path configured to pass a second feedback current i21' between the output terminal and the inverting input terminal (−) of the gm amplifier AMP41. The second feedback current i21' can be a copy (mirror current) of the first feedback current i21, or can be one obtained by giving a copy of the first feedback current i21 an offset.

The error amplifier 42 is a functional block that generates the error signal Vc corresponding to the error between the current sense signal Vcso and the predetermined reference signal Vref, and includes a gm amplifier AMP42 and a capacitor Cc.

The non-inverting input terminal (+) of the gm amplifier AMP42 is connected to an application terminal for the reference signal Vref. The inverting input terminal (−) of the gm amplifier AMP42 is connected to an application terminal for the current sense signal Vcso. The output terminal of the gm amplifier AMP42 is connected to the first terminal of the capacitor Cc. The second terminal of the capacitor Cc is connected to the ground terminal.

The V-I converter 43 is a functional block that converts the current adjustment voltage Vladj into a reference current i22, and includes a gm amplifier AMP43 and a feedback resistor R13. The gm amplifier AMP43 controls the reference current i22 through the input resistor R11P such that the current adjustment voltage Vladj, which is fed to the non-inverting input terminal (+) of the gm amplifier AMP43, is equal to the terminal voltage (=i22×R13) across the feedback resistor R13, which is fed to the inverting input terminal (−) of the gm amplifier AMP43.

As described above, in the LED driver IC 1 of this embodiment, the current sense amplifier 41 and the error amplifier 42 lie in a common input system. In other words, with respect to the SNSP and SNSN pins, the current sense amplifier 41 and the error amplifier 42 are cascade-connected.

Thus, the feedback control point (Vin=0) of the error amplifier 32 serves as the input to the current sense amplifier 31 and this makes the input potential difference ΔV in the current sense amplifier 31 zero. As a result, even when the sense voltage Vsns_IC appears between the SNSP and SNSN pins, no current difference occurs between the SNSP and SNSN pins, and this makes less likely a drop in current sense accuracy in the LED driver IC 1 (hence a deviation of the output current ILED from the target value).

LED Lamp Module (Ninth Embodiment)

Figure 17:
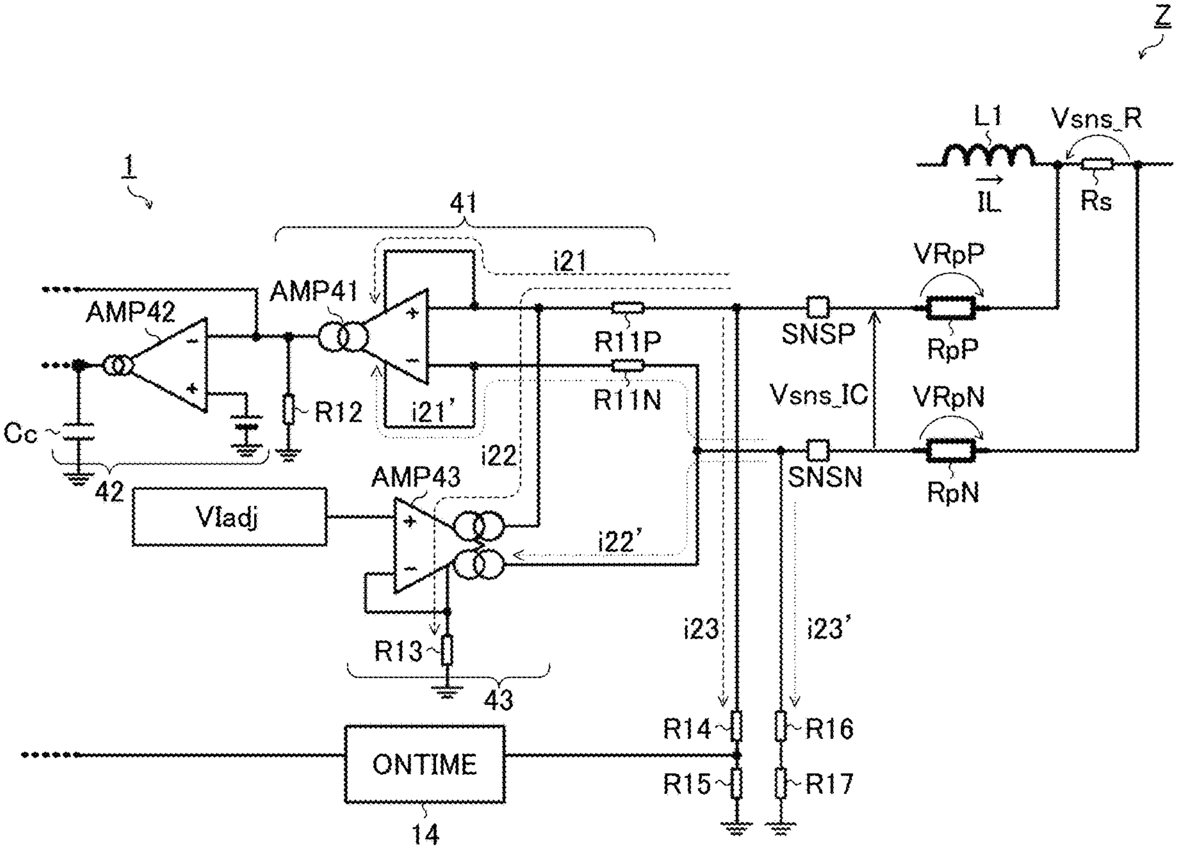
FIG. 17 is a diagram showing an LED lamp module according to a ninth embodiment.

FIG. 17 is a diagram showing an LED lamp module according to a ninth embodiment. In the LED lamp module Z of the this embodiment, the LED driver IC 1 is based on the eighth embodiment (FIG. 16) described previously and is further devised so as to bring the current difference between the SNSP and SNSN pins closer to zero.

Specifically, in terms of what is shown in the diagram, the V-I converter 43 passes the reference current i22 mentioned previously through the input resistor R11P and in addition draws a correction current i22' equal to the reference current i22 directly from the SNSN pin. This aspect is as shown in FIG. 13 referred to earlier.

Moreover, through the resistor voltage division circuit (i.e., resistors R14 and R15) for transmitting the terminal voltage (=VLED+Vsns_R+VRpP) appearing at the SNSP pin to the on-time setter 14 passes a sink current i23 from the SNSP pin toward the ground terminal. Accordingly, between the SNSN pin and the ground terminal, there is provided a resistor circuit (i.e., resistors R16 and R17) for passing a correction current i23' equal to the sink current i23.

With the LED driver IC 1 of this embodiment, i21=i21', i22=i22', and i23=i23'. Hence, the sum current (=i21+i22+i23) that passes at the SNSP pin is equal to the sum current (=i21'+i22'+i23') that passes at the SNSN pin. That is, the current difference between the SNSP and SNSN pins is always zero.

With this configuration, even when the SNSP and SNSN pins have the current-limiting resistors RpP and RpN externally connected to them respectively, it is possible to eliminate a drop (in particular, temperature drift) in current sense accuracy in the LED driver IC 1.

Moreover, externally connecting the current-limiting resistors RpP and RpN makes it possible to protect the electrostatic protection diodes Desd (see FIG. 5) in the LED driver IC 1 from the surge currents ID1 and ID2. This eliminates the need for the externally connected surge protection diodes DH and DL that are otherwise needed one each for each channel. It is thus possible to reduce the cost of the LED lamp module Z and to reduce the component mounting area on the circuit board.

LED Lamp Module (Tenth Embodiment)

Figure 18:
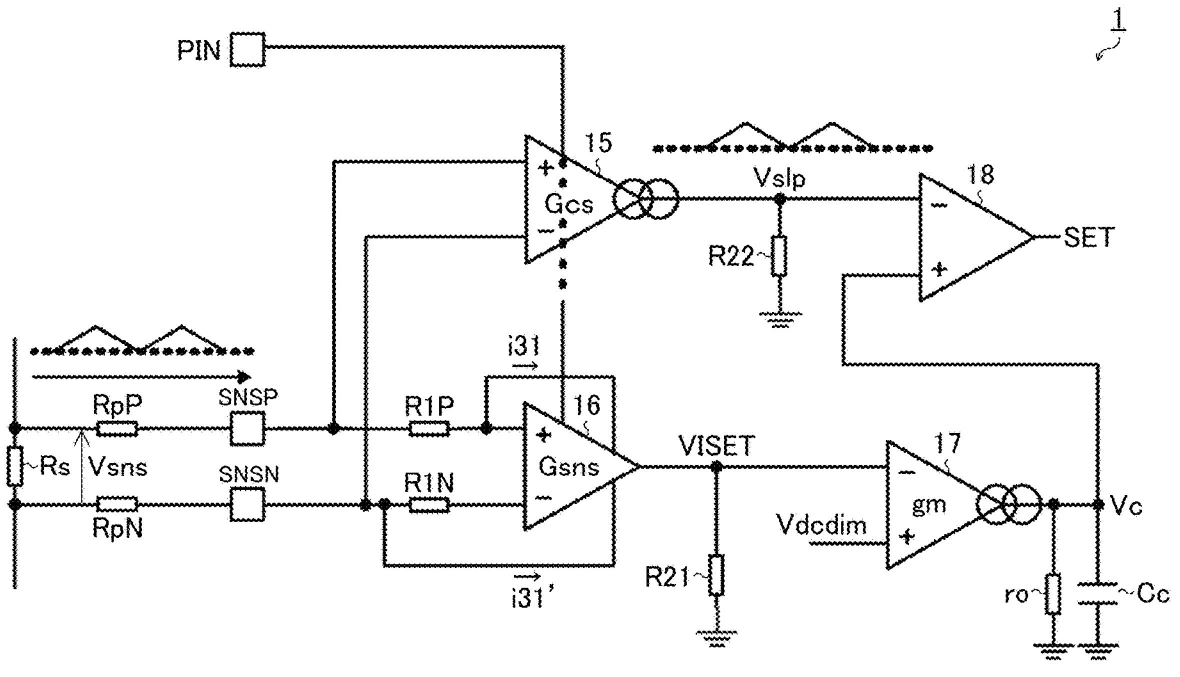
FIG. 18 is a diagram showing an LED lamp module according to a tenth embodiment.

FIG. 18 is a diagram showing an LED lamp module according to a tenth embodiment (corresponding to a second comparative example for comparison with the eleventh embodiment described later). The diagram depicts, based on the first embodiment (FIG. 1) described previously, one example of a more specific circuit configuration. Accordingly, such components as have already been described are identified by the same reference signs as in FIG. 1 and no overlapping description will be repeated. The following description thus focuses on additional and modified features.

The LED driver IC 1 of this embodiment has, integrated in it, what has been described above, namely the slope signal generator 15, the current sense amplifier 16, the error amplifier 17, the comparator 18, the input resistors R1P and R1N, and the capacitor Cc, and, in addition, resistors R21, R22, and Ro Moreover, the LED driver IC 1 of this embodiment has current-limiting resistors RpP and RpN connected respectively between the first terminal (high-potential terminal) of the sense resistor Rs and the SNSP pin and between the second terminal (low-potential terminal) of the sense resistor Rs and the SNSN pin.

The error amplifier 17 outputs a current corresponding to the difference between an analog dimming signal Vdcdim (corresponding to a predetermined current setting signal), which is fed to the non-inverting input terminal (+) of the error amplifier 17, and the current sense signal VISET, which is fed to the inverting input terminal (−) of the error amplifier 17; the error amplifier 17 thereby charge and discharge the capacitor Cc to generate the error signal Vc. Accordingly, the error signal Vc rises when VISET<Vdcdim, and falls when VISET>Vdcdim. Between the output terminal of the error amplifier 17 and the ground terminal, a resistor ro is connected in parallel with the capacitor Cc. The capacitor Cc is for phase compensation. On the other hand, the resistor ro is the output impedance of the error amplifier 17 and does not exist as a real component.

The slope signal generator 15 is a gm amplifier that operates by being supplied with a current from the PIN pin and that can, without drawing a current from the SNSP and SNSN pins, sense the sense voltage Vsns appearing between those terminals. Between the output terminal of the slope signal generator 15 and the ground potential, the resistor R22 is connected.

The current sense amplifier 16 operates by being supplied with a current from the PIN pin, and amplifies the sense voltage Vsns to generate the current sense signal VISET. The non-inverting input terminal (+) of the current sense amplifier 16 is connected via the input resistor R1P to the SNSP pin. The inverting input terminal (−) of the current sense amplifier 16 is connected via the input resistor R1N to the SNSN pin. The output terminal of the current sense amplifier 16 (i.e., an application terminal for the current sense signal VISET) is connected to the first terminal of the resistor R21 and to the inverting input terminal (−) of the error amplifier 17. The second terminal of the resistor R21 is connected to the ground terminal.

The current sense amplifier 16 also has a first feedback current path configured to pass a first feedback current i31 between the output terminal and the non-inverting input terminal (+) of the current sense amplifier 16 and a second feedback current path configured to pass a second feedback current i31' between the output terminal of the current sense amplifier 16 and the SNSN pin. The second feedback current i31' can be a copy (mirror current) of the first feedback current i31, or can be one obtained by giving a copy of the first feedback current i31 an offset.

With this configuration, even when the SNSP and SNSN pins have the current-limiting resistors RpP and RpN externally connected to them respectively, it is possible to reduce the differential input current difference in the current sense amplifier 16 (hence the gain error in the current sense amplifier 16). It is thus possible to eliminate a drop (in particular, temperature drift) in current sense accuracy in the LED driver IC 1.

Moreover, externally connecting the current-limiting resistors RpP and RpN makes it possible to protect the electrostatic protection diodes Desd (see FIG. 5) incorporated in the SNSP and SNSN pins respectively from a surge current. This eliminates the need for the externally connected surge protection diodes DH and DL (FIG. 7). It is thus possible to reduce the cost of the LED lamp module Z and to reduce the component mounting area on the circuit board.

However, the LED driver IC 1 of this embodiment requires two floating amplifiers (the slope signal generator 15 and the current sense amplifier 16) that can amplify the sense voltage Vsns on a rail-to-rail basis (between the supply potential and the ground potential). This, it should be noted, requires an increased circuit area. Note that, in the present description, "floating" means floating (potentially isolated) from the ground potential.

Figure 19:
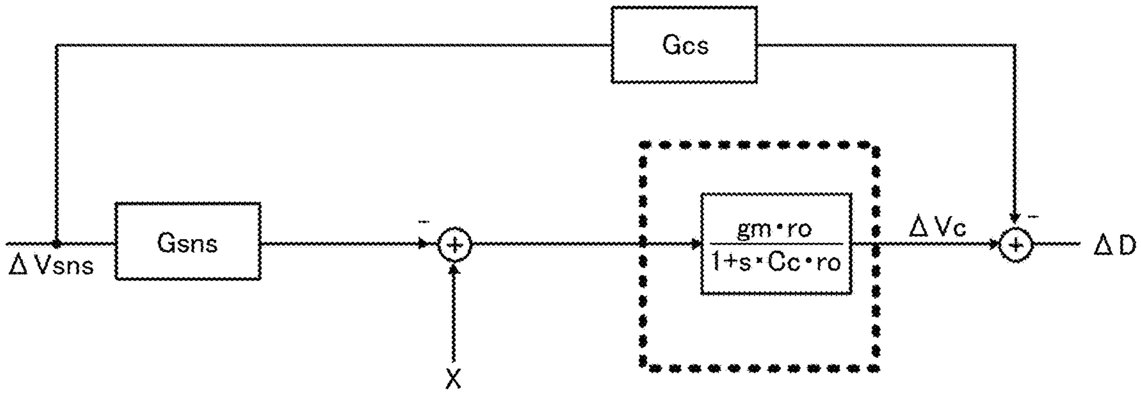
FIG. 19 is a diagram showing one example of signal transmission in the eighth embodiment.

FIG. 19 is a diagram showing one example of signal transmission in the LED driver IC 1 of the tenth configuration (i.e., FIG. 16 referred to previously as redrafted into a block-line diagram). The symbol Gcs represents the gain of the slope signal generator 15. The symbol Gsns represents the gain of the current sense amplifier 16. The symbol gm represents the transconductance (the conversion value for conversion from the amplifier input voltage to the amplifier output current) of the error amplifier 17. The symbol ΔVsns represents the sense voltage Vsns. The symbol X represents the set current value (target value) of the output current ILED. The symbol ΔVc represents the error signal Vc. ΔD represents the off-duty of the low-side switch 11L (controlling the bottom value of the inductor current IL is equivalent to controlling the off-period). The symbol ro represents the resistance value of the resistor ro (i.e., the output impedance of the error amplifier 17). The symbol Cc represents the capacitance value of the capacitor Cc. The symbol s represents a complex number s (=jω).

As will be understood from the diagram, the signal transmission system in the LED driver IC 1 of the tenth embodiment has first-order characteristics having as the control point the inductor current IL (which equals the average inductor current IL_ave plus the ripple amplitude ΔIL).

LED Lamp Module (Eleventh Configuration)

Figure 20:
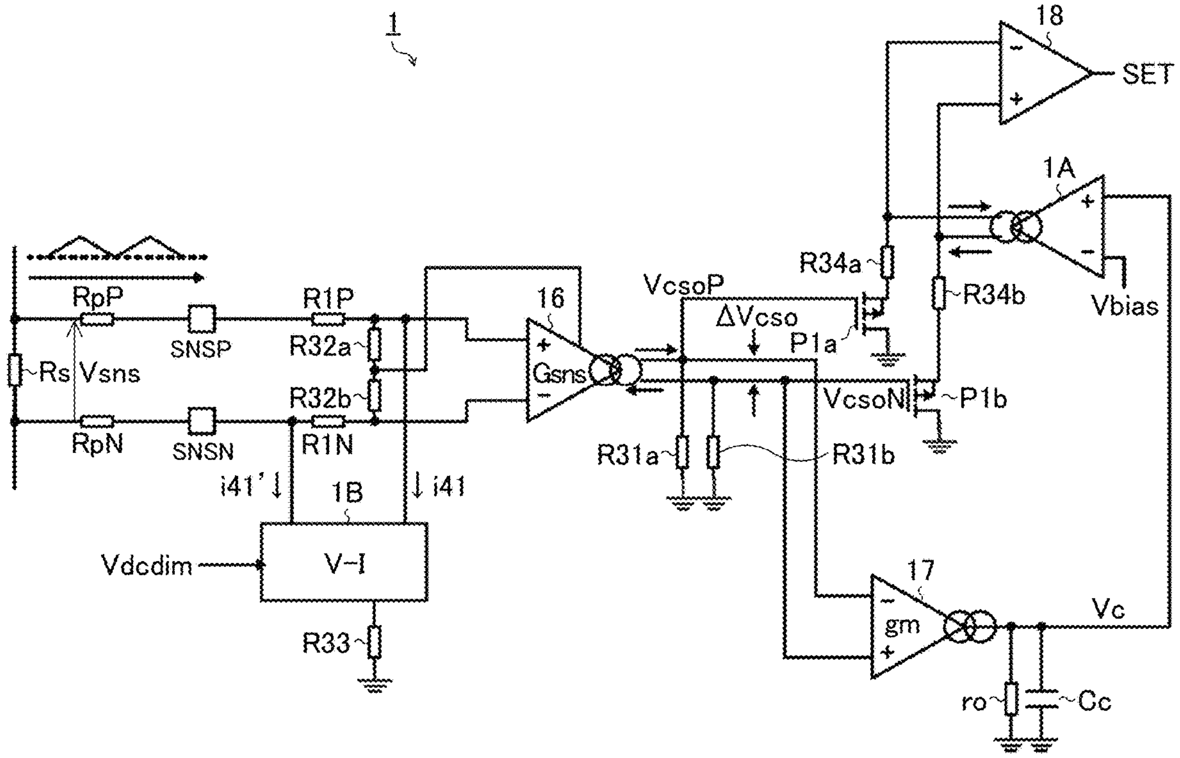
FIG. 20 is a diagram showing an LED lamp module according to an eleventh embodiment.

FIG. 20 is a diagram showing an LED lamp module according to an eleventh embodiment. The LED driver IC 1 of this embodiment has, integrated in it, the current sense amplifier 16, the error amplifier 17, the comparator 18, the input resistors R1P and R1N, and the capacitor Cc shown in FIG. 18, and, in addition, a bias amplifier 1A, a V-I converter 1B, transistors P1*a* and P1*b* (e.g., PMOSFETs), and resistors R31*a*, R31*b*, R32*a*, R32*b*, R33, R34*a*, R34*b*, and Ro. Note that the slope signal generator 15 described previously is omitted from the LED driver IC 1 of this embodiment.

Moreover, the LED driver IC 1 of this embodiment has current-limiting resistors RpP and RpN connected respectively between the first terminal (high-potential terminal) of the sense resistor Rs and the SNSP pin and between the second terminal (low-potential terminal) of the sense resistor Rs and the SNSN pin. This aspect is the same as in FIG. 18 referred to previously.

The V-I converter 1B is a functional block that converts a voltage signal (specifically, the analog dimming signal Vdcdim) into a current signal (specifically, first and second reference currents i41 and i41').

As shown in the diagram, in the LED driver IC 1 of this embodiment, to generate the reference voltage for the current sense amplifier 16 (i.e., a scaled analog dimming signal Vdcdim×R1P/R33) requires that the first reference current i41 be passing through the V-I converter 1B. To achieve that, the LED driver IC 1 of this embodiment includes a first reference current path configured to pass the first reference current i41 between the SNSP pin and the first output terminal of the V-I converter 1B.

However, with a configuration where the first reference current i41 passes only through the current-limiting resistor RpP externally connected to the SNSP pin, the reference voltage for the current sense amplifier 16 deviates by the terminal-to-terminal voltage across the current-limiting resistor RpP. To avoid that, the LED driver IC 1 of this embodiment includes a second reference current path configured to pass a second reference current i41' between the SNSN pin and the second output terminal of the V-I converter 1B. The first and second reference currents i41 and i41' can have the same value, or can have a predetermined offset between them.

With this configuration where the first reference current i41 needed to generate the reference voltage for the current sense amplifier 16 is corrected with the second reference current i41', even when the SNSP and SNSN pins have the current-limiting resistors RpP and RpN externally connected to them respectively, the gain of the V-I converter 1B (hence the reference voltage for the current sense amplifier 16) is uniquely determined according to the ratio of the input resistor R1P to the resistor R33, and it is thus possible to eliminate a drop (in particular, temperature drift) in current sense accuracy in the LED driver IC 1.

The current sense amplifier 16 amplifies the sense voltage Vsns to generate a differential current sense signal ΔVcso (=VcsoP−VcsoN). The non-inverting input terminal (+) of the current sense amplifier 16 is connected via the input resistor R1P to the SNSP pin. The inverting input terminal (−) of the current sense amplifier 16 is connected via the input resistor R1N to the SNSN pin. The first differential output terminal of the current sense amplifier 16 is connected to the first terminal of the resistor R31*a* and also to the inverting input terminal (−) of the error amplifier 17. The second differential output terminal of the current sense amplifier 16 is connected to the first terminal of the resistor R31*b* and also to the non-inverting input terminal (+) of the error amplifier 17. The second terminals of the resistors R31*a* and R31*b* are both connected to the ground terminal. Between the non-inverting input terminal (+) and inverting input terminal (−) of the current sense amplifier 16, the resistors R32*a* and R32*b* are connected in series and, from the connection node between them, a driving voltage for the current sense amplifier 16 is supplied to it.

The error amplifier 17 outputs a current corresponding to a current sense signal ΔVcso that is differentially input between the non-inverting input terminal (+) and the inverting input terminal (−) of the error amplifier 17; the error amplifier 17 thereby charges and discharges the capacitor Cc to generate the error signal Vc. Between the output terminal of the error amplifier 17 and the ground terminal, the resistor ro is connected in parallel with the capacitor Cc.

The gate of the transistor P1*a* is connected to the first differential output terminal of the current sense amplifier 16. The drain of the transistor P1*a* is connected to the ground terminal. The source of the transistor P1*a* is connected to the first terminal of the resistor R34*a*. The second terminal of the resistor R34*a* is connected to the inverting input terminal (−) of the comparator 18. So connected, the transistor P1*a* functions as a first voltage follower (first source follower) connected between the first differential output terminal of the current sense amplifier 16 and the inverting input terminal (−) of the comparator 18.

The gate of the transistor P1*b* is connected to the second differential output terminal of the current sense amplifier 16. The drain of the transistor P1*b* is connected to the ground terminal. The source of the transistor P1*b* is connected to the first terminal of the resistor R34*b*. The second terminal of the resistor R34b is connected to the non-inverting input terminal (+) of the comparator 18. So connected, the transistor P1b functions as a second voltage follower (second source follower) connected between the second differential output terminal of the current sense amplifier 16 and the non-inverting input terminal (+) of the comparator 18.

The bias amplifier 1A outputs, according to the difference between the error signal Vc, which is fed to the non-inverting input terminal (+) of the bias amplifier 1A, and a bias voltage Vbias, which is fed to the inverting input terminal (−) of the bias amplifier 1A, a differential current to each of the resistors R34a and R34b. The bias amplifier 1A thereby determines the operating point of each of the first and second voltage followers.

In terms of what is shown in the diagram, the inverting input terminal (−) of the comparator 18 is fed with a subtraction signal (=VcsoP+Vgs(P1a)−(Vc−Vbias)) resulting from subtracting the error signal Vc from the output signal (=VcsoP+Vgs(P1a)) of the first voltage follower.

On the other hand, the non-inverting input terminal (+) of the comparator 18 is fed with an addition signal (=VcsoN+Vgs(P1b)+(Vc−Vbias)) resulting from adding up the output signal (=VcsoN+Vgs(P1b)) of the second voltage follower and the error signal Vc.

Thus, when (VcsoP−Vc)−(VcsoN+Vc)>0, that is, when ΔVcso−2Vc>0, the comparator 18 switches the logic level of the set signal SET. To put fully, at the moment that the current information ΔVcso reaches the error signal Vc, the bottom value of the inductor current IL is detected.

Any configuration that senses the difference between the inductor current IL and its target value brings the differential input difference in the current sense amplifier 16 to zero (so that the DC error equals zero) and thus no current difference occurs between the SNSP and SNSN pins. This eliminates the need to supply the current sense amplifier 16 with electric power from the PIN pin and makes it possible to achieve Δ zero bias current. It is also possible to integrate the slope signal generator 15 into the current sense amplifier 16 thereby to reduce the circuit scale.

Figure 21:
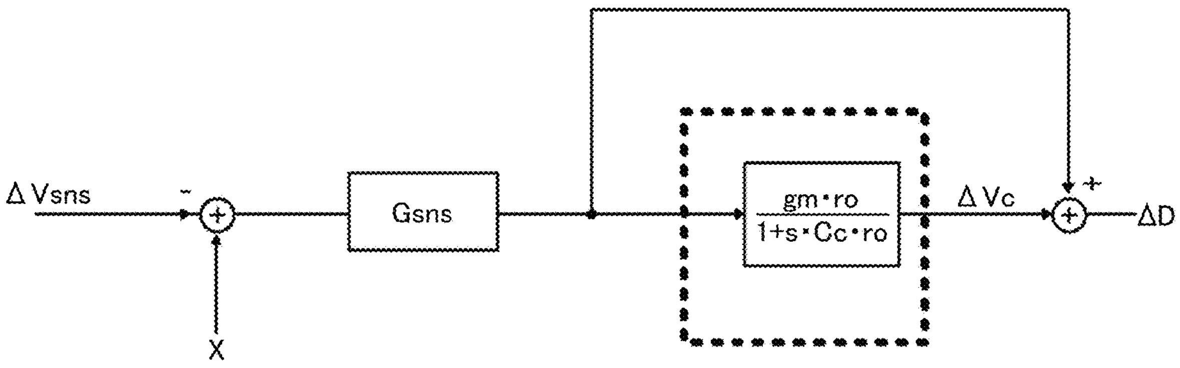
FIG. 21 is a diagram showing one example of signal transmission in the tenth embodiment.

FIG. 21 is a diagram showing one example of signal transmission in the LED driver IC 1 of the eleventh configuration (i.e., FIG. 20 referred to previously as redrafted into a block-line diagram). The symbol Gsns represents the gain of the current sense amplifier 16. The symbol gm represents the transconductance (the conversion value for conversion from the amplifier input voltage to the amplifier output current) of the error amplifier 17. The symbol ΔVsns represents the sense voltage Vsns. The symbol X represents the set current value (target value) of the output current ILED. The symbol ΔVc represents the error signal Vc. ΔD represents the off-duty of the low-side switch 11L (controlling the bottom value of the inductor current IL is equivalent to controlling the off-period). The symbol ro represents the resistance value of the resistor ro (i.e., the output impedance of the error amplifier 17). The symbol Cc represents the capacitance value of the capacitor Cc. The symbol s represents a complex number s (=jω).

As will be understood from the diagram, the signal transmission system in the LED driver IC 1 of the eleventh embodiment is a system that has as a control point only the current ripple component ΔIL of the inductor current IL. Moreover, the signal transmission system in the diagram can generate a high-speed path for the current error component (the difference value between the output current ILED and the set current value).

Overview

To follow is an overview of the various embodiments disclosed herein.

According to one aspect of what is disclosed herein, a semiconductor device includes: a current sense circuit configured to generate a current sense signal corresponding to a monitoring target current; an error amplifier configured to generate an error signal corresponding to the error between the current sense signal and a predetermined reference signal; a comparator configured to generate a set signal by comparing the error signal with the current sense signal; and a controller configured to be fed with the set signal to control the monitoring target current. The current sense circuit includes: a differential amplifier of a current output type; a first input resistor configured to be connected between a first input terminal of the differential amplifier and a first current sense terminal; a second input resistor configured to be connected between a second input terminal of the differential amplifier and a second current sense terminal; an output resistor configured to be connected to an output terminal of the differential amplifier; a first feedback current path configured to pass across it a first feedback current between the first input terminal and the output terminal of the differential amplifier; and a second feedback current path configured to pass across it a second feedback current between the second input terminal and the output terminal of the differential amplifier. (A first configuration.)

In the semiconductor device of the first configuration described above, the first and second feedback currents may have equal values. (A second configuration.)

In the semiconductor device of the first configuration described above, the first and second feedback currents may have an offset between them. (A third configuration.)

According to another aspect of what is disclosed herein, a semiconductor device includes: a current sense circuit configured to generate a current sense signal corresponding to a monitoring target current; an error amplifier configured to generate an error signal corresponding to the error between the current sense signal and a predetermined reference signal; a comparator configured to generate a set signal by comparing the error signal with the current sense signal; and a controller configured to be fed with the set signal to control the monitoring target current. The current sense circuit includes: a differential amplifier of a current output type; a first input resistor configured to be connected between a first input terminal of the differential amplifier and a first current sense terminal; a second input resistor configured to be connected between a second input terminal of the differential amplifier and a second current sense terminal; a V-I converter configured to convert a voltage signal into a current signal; a feedback resistor configured to determine the gain of the V-I converter; a first feedback current path configured to pass across it a first reference current between the first current sense terminal and a first output terminal of the V-I converter; and a second feedback current path configured to pass across it a second reference current between the second current sense terminal and a second output terminal of the V-I converter. (A fourth configuration.)

The semiconductor device according to any of the first to fourth embodiments described above may further include: an on-time setter configured to generate a pulse in a reset signal at the lapse of a predetermined on-time from the timing of pulse generation in the set signal. The controller may perform control by a bottom-detection fixed-on-time scheme according to the set signal and the reset signal so as to keep the monitoring target current equal to a predetermined target value. (A fifth configuration.)

In the semiconductor device of the fifth configuration described above, the on-time setter may include a source follower configured to sense the terminal voltage appearing at the second current sense terminal without drawing a current from the first and second current sense terminals. (A sixth configuration.)

According to yet another aspect of what is disclosed herein, a module includes: the semiconductor device according to any of the first to sixth embodiments described above; an inductor, a sense resistor, and a load connected in series with an output element; a first current-limiting resistor connected between the first current sense terminal and the sense resistor; and a second current-limiting resistor connected between the second current sense terminal and the sense resistor. (A seventh configuration.)

In the module according to the seventh configuration described above, the load includes a light-emitting diode element. (An eighth configuration.)

The module according to the eighth configuration described above may further include: a matrix manager configured to freely switch the number of stages of the light-emitting diode elements. (A ninth configuration.)

According to the disclosure herein, it is possible to provide a semiconductor device and a module with high current sense accuracy.

OTHER MODIFICATIONS

The various technical features disclosed herein may be implemented in any manners other than as in the embodiments described above, and allow for many modifications without departure from the spirit of their technical ingenuity. That is, the embodiments described above should be understood to be in every aspect illustrative and not restrictive, and the technical scope of the present disclosure is defined not by the description of the embodiments given above but by the appended claims and encompasses any modifications within a scope and sense equivalent to those claims.

The invention claimed is:

1. A semiconductor device comprising:
- a current sense circuit configured to generate a current sense signal corresponding to a monitoring target current;
- an error amplifier configured to generate an error signal corresponding to an error between the current sense signal and a predetermined reference signal;
- a comparator configured to generate a set signal by comparing the error signal with the current sense signal; and
- a controller configured to be fed with the set signal to control the monitoring target current, wherein the current sense circuit includes:
  - a differential amplifier of a current output type;
  - a first input resistor configured to be connected between a first input terminal of the differential amplifier and a first current sense terminal;
  - a second input resistor configured to be connected between a second input terminal of the differential amplifier and a second current sense terminal;
  - an output resistor configured to be connected to an output terminal of the differential amplifier;
  - a first feedback current path configured to pass thereacross a first feedback current between the first input terminal and the output terminal of the differential amplifier; and
  - a second feedback current path configured to pass thereacross a second feedback current between the second input terminal and the output terminal of the differential amplifier.

2. The semiconductor device according to claim 1, wherein the first and second feedback currents have equal values.

3. The semiconductor device according to claim 1, wherein the first and second feedback currents have an offset therebetween.

4. A semiconductor device comprising:
- a current sense circuit configured to generate a current sense signal corresponding to a monitoring target current;
- an error amplifier configured to generate an error signal corresponding to an error between the current sense signal and a predetermined reference signal;
- a comparator configured to generate a set signal by comparing the error signal with the current sense signal; and
- a controller configured to be fed with the set signal to control the monitoring target current, wherein the current sense circuit includes:
  - a differential amplifier of a current output type;
  - a first input resistor configured to be connected between a first input terminal of the differential amplifier and a first current sense terminal;
  - a second input resistor configured to be connected between a second input terminal of the differential amplifier and a second current sense terminal;
  - a V-I converter configured to convert a voltage signal into a current signal;
  - a feedback resistor configured to determine a gain of the V-I converter;
  - a first feedback current path configured to pass thereacross a first reference current between the first current sense terminal and a first output terminal of the V-I converter; and
  - a second feedback current path configured to pass thereacross a second reference current between the second current sense terminal and a second output terminal of the V-I converter.

5. The semiconductor device according to claim 1, further comprising:
- an on-time setter configured to generate a pulse in a reset signal at a lapse of a predetermined on-time from a timing of pulse generation in the set signal, wherein the controller performs control by a bottom-detection fixed-on-time scheme according to the set signal and the reset signal so as to keep the monitoring target current equal to a predetermined target value.

6. The semiconductor device according to claim 5, wherein the on-time setter includes a source follower configured to sense a terminal voltage appearing at the second current sense terminal without drawing a current from the first and second current sense terminals.

7. A module comprising:
- the semiconductor device according to claim 1;
- an inductor, a sense resistor, and a load connected in series with an output element;
- a first current-limiting resistor connected between the first current sense terminal and the sense resistor; and a second current-limiting resistor connected between the second current sense terminal and the sense resistor.

8. The module according to claim 7 wherein the load includes a light-emitting diode element.

9. The module according to claim 8, further comprising:

a matrix manager configured to freely switch a number of stages of the light-emitting diode elements.

10. The semiconductor device according to claim 4, further comprising:

an on-time setter configured to generate a pulse in a reset signal at a lapse of a predetermined on-time from a timing of pulse generation in the set signal, wherein the controller performs control by a bottom-detection fixed-on-time scheme according to the set signal and the reset signal so as to keep the monitoring target current equal to a predetermined target value.

11. The semiconductor device according to claim 10, wherein the on-time setter includes a source follower configured to sense a terminal voltage appearing at the second current sense terminal without drawing a current from the first and second current sense terminals.

12. A module comprising:

the semiconductor device according to claim 4;

an inductor, a sense resistor, and a load connected in series with an output element;

a first current-limiting resistor connected between the first current sense terminal and the sense resistor; and a second current-limiting resistor connected between the second current sense terminal and the sense resistor.

13. The module according to claim 12 wherein the load includes a light-emitting diode element.

14. The module according to claim 13, further comprising:

a matrix manager configured to freely switch a number of stages of the light-emitting diode elements.

* * * * *